United States Patent
Perreault

(10) Patent No.: US 11,159,586 B2
(45) Date of Patent: Oct. 26, 2021

(54) DYNAMICALLY CONTROLLING RELAY COMMUNICATION LINKS DURING A COMMUNICATION SESSION

(71) Applicant: Jive Communications, Inc., Orem, UT (US)

(72) Inventor: Simon Perreault, Québec (CA)

(73) Assignee: JIVE COMMUNICATIONS, INC., Orem, UT (US)

( * ) Notice: Subject to any disclaimer, the term of this patent is extended or adjusted under 35 U.S.C. 154(b) by 3 days.

(21) Appl. No.: 16/404,971

(22) Filed: May 7, 2019

(65) Prior Publication Data

US 2020/0358832 A1 Nov. 12, 2020

(51) Int. Cl.
*H04L 29/06* (2006.01)

(52) U.S. Cl.
CPC ...... *H04L 65/1093* (2013.01); *H04L 65/1069* (2013.01); *H04L 65/403* (2013.01); *H04L 65/608* (2013.01)

(58) Field of Classification Search
CPC ............. H04L 65/1093; H04L 65/1069; H04L 65/403; H04L 65/608
See application file for complete search history.

(56) References Cited

U.S. PATENT DOCUMENTS

| | | | | |
|---|---|---|---|---|
| 8,499,083 B2* | 7/2013 | Tanimoto | ............ | H04L 67/2842 709/227 |
| 8,520,505 B1* | 8/2013 | Kruglick | ............... | H04L 1/1845 370/216 |
| 8,738,788 B2* | 5/2014 | Tanimoto | ............ | H04L 12/4641 709/229 |
| 9,225,785 B2* | 12/2015 | Lucas | ................. | H04L 65/1043 |
| 9,980,200 B2* | 5/2018 | Balercia | ................ | H04L 5/0037 |
| 2012/0213148 A1* | 8/2012 | Saito | .................... | H04L 5/0023 370/315 |
| 2014/0143396 A1* | 5/2014 | Tsai | .................... | H04L 65/4069 709/223 |
| 2015/0143395 A1* | 5/2015 | Reisman | .......... | H04N 21/47202 725/14 |

* cited by examiner

*Primary Examiner* — SM A Rahman
(74) *Attorney, Agent, or Firm* — Keller Jolley Preece

(57) ABSTRACT

This disclosure relates to a communication network within which relays, which are connected to devices participating in a communication session (e.g., a video conference), are dynamically added and removed from the communication session. For instance, when participating in a communication session, a sending network device sends media streams (e.g., audio and/or video media streams) to its associated relay. The relay sends, through a relay communication link, the media streams to one or more receiving relays. The one or more receiving relays then forward the media stream to associated receiving network devices. As additional network devices join the communication session, the additional network devices connect to additional relays, which establish a network of relay communication links with all the relays involved in the communication session. Furthermore, as network devices leave the communication session, relays can be removed from the communication session.

20 Claims, 11 Drawing Sheets

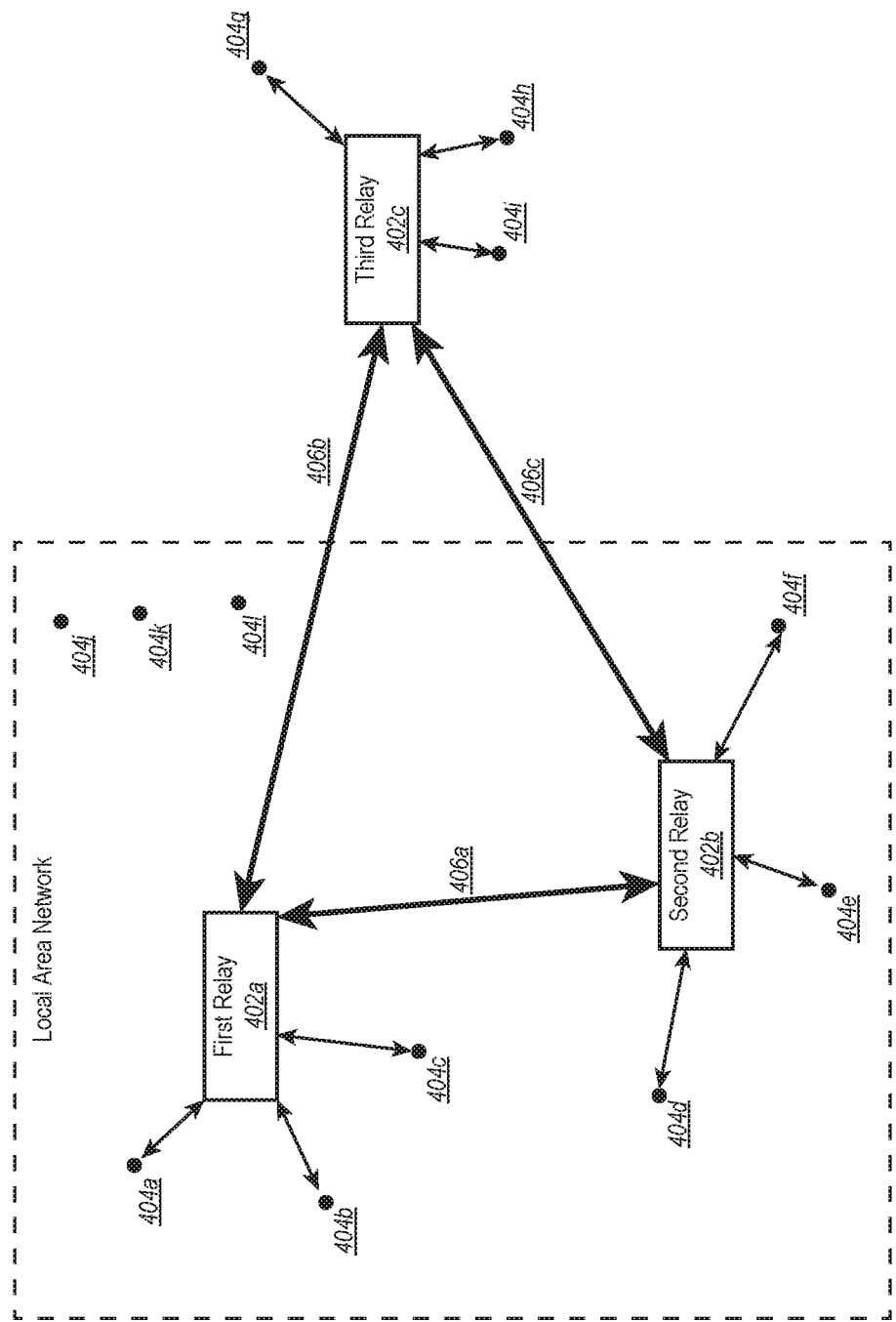

DYNAMICALLY CONTROLLING RELAY COMMUNICATION LINKS DURING A COMMUNICATION SESSION

BACKGROUND

Modern communication technology enables users to communicate using network or Internet-based communication systems. For example, modern computer devices and communication networks can allow two users to communicate in a real-time communication session (e.g., a voice or a video call). Additionally, modern communication technology enables multiple users to participate in a single communication session (e.g., a conference call or a video conference). Despite their current capabilities, however, conventional communication systems suffer from several technological problems.

For example, as the number of participating network devices in a communication session increases, the communication quality (e.g., audio and/or video quality) and communication reliability can significantly decrease in many conventional communication systems. For instance, some conventional systems rely on a peer-to-peer transfer of media streams where each network device in a communication session sends separate media streams to each of the other participating network devices. In addition, each network device in the communication session receives separate media streams from each of the other participating network devices. Therefore, in many conventional peer-to-peer communication systems, an individual network device may simultaneously capture and send multiple media streams (e.g., one media stream to each participant), as well as receive, process, and display several other media streams (e.g., one media stream from each participant).

As the number of participating network devices in a communication session increases, the number of media streams that a particular network device simultaneously sends and receives can result in a communication bandwidth bottleneck, which in turn diminishes the quality of the communication session (e.g., results in distorted audio or video). Moreover, simultaneously sending, receiving, processing, and displaying a large number of media streams often overloads the computational or graphical processor capacity of an individual network device, which can result in diminished quality and dropped connections during a communication session. Accordingly, conventional communication systems that rely on a peer-to-peer transfer of media streams are significantly limited in the number of network devices that can participate in a communication session without exceeding computer hardware capabilities and communication bandwidth resources to the point of affecting the quality and reliability of the communication session.

As an alternative to peer-to-peer systems, some conventional communication systems rely on a central mixing unit that receives a media stream from each network device participating in a communication session, mixes the media streams into a combined media stream, and then sends the combined media stream to each of the participating network devices. In some cases, the central mixing unit can relieve computational strain on an individual network device when compared to a peer-to-peer system because each network device sends only a single media stream to the central mixing unit and receives only a single media stream from the central mixing unit, however, the central mixing unit often becomes overloaded with the addition of communication session participants.

For example, the process of combining several audio and/or video media streams is computationally expensive. Indeed, as the number of participants in a communication session increases, the more computational burden is placed on the central mixing unit, and eventually the central mixing unit is overloaded and fails to effectively mix the media streams. Accordingly, conventional systems that rely on a central mixing unit to combine the media streams and distribute combined media streams have technical limitations to the number of participants that can participate without affecting the quality of the communication session or without dropping participants from the communication session.

Thus, there are several disadvantages with regard to conventional communication systems.

SUMMARY

Systems, methods, and computer readable medium described herein enable a communication system to dynamically add and remove relay devices associated with network devices (e.g., end-user devices) to a mesh or network of relay devices in a multi-device communication session (or "communication session"). In some embodiments, for instance, the communication system establishes a communication session (e.g., a video or voice conference) between a group of network devices that are connected to a relay device. The communication system can dynamically determine to add one or more additional relay devices to further support the communication session based on characteristics of the communication session (e.g., additional participants joining the communication session). Upon adding the additional relay devices, the communication system generates a relay communication link between each of the relay devices. The relay communication links result in a relay mesh that efficiently and reliably distributes media streams to the participating network devices of the communication session.

The dynamic addition of relays based on communication session characteristics avoids many of the disadvantages of conventional peer-to-peer systems. For example, because each network device is associated with a relay device, each network device sends only a single media stream to its associated relay. This significantly reduces strain on computational and communication bandwidth resources compared to conventional peer-to-peer systems. Moreover, the dynamic addition of relays avoids the disadvantages of conventional central mixing unit systems. In particular, the system can add an additional relay device in the event the load on a particular relay device approaches a computational and/or reliability limit. Accordingly, the resulting system provides a more efficient, higher quality, and more reliable communication system.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims or may be learned by the practice of such exemplary embodiments as set forth hereinafter.

BRIEF DESCRIPTION OF THE DRAWINGS

Various embodiments will be described and explained with additional specificity and detail through the use of the accompanying drawings in which:

FIGS. 4A-4B illustrate example communication channels between multiple network devices and multiple relay devices located inside and outside a local area network;

DETAILED DESCRIPTION

Figure 1:
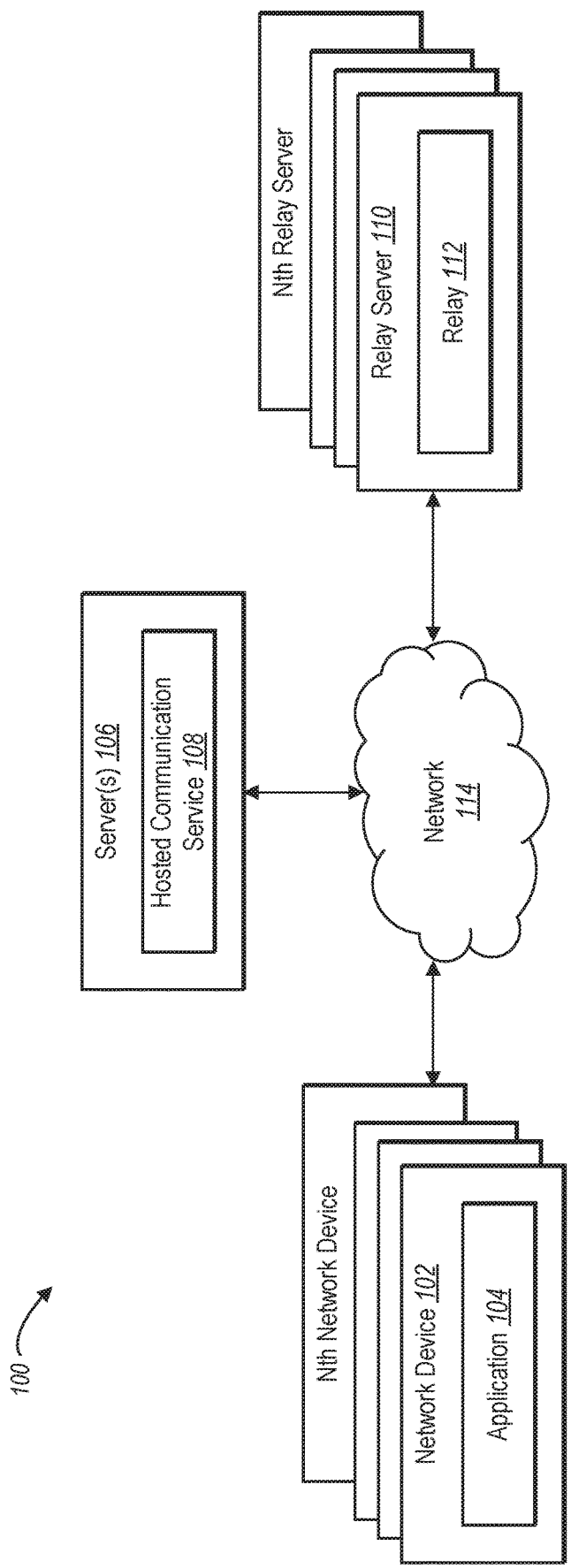
FIG. 1 illustrates a network-based communication system in accordance with one or more embodiments disclosed herein.

This disclosure describes one or more embodiments of a network-based communication system that dynamically adds or removes relay devices associated with network devices to a network of relays during a communication session. For example, in at least one embodiment, the network-based communication system establishes a communication session (e.g., a voice or video conference) between a group of network devices that are associated with a first relay device. The network-based communication system can dynamically add a second relay device to the communication session during the communication session, where one or more additional other devices are connected to the second relay. Furthermore, during the communication session, the network-based communication system dynamically generates a relay communication link between the first relay and the second relay to enable communication between the group of network devices associated with the first relay and the one or more network devices associated with the second relay to generate an efficient and reliable relay network for the communication system.

Using the processes and systems described herein, the network-based communication system can provide a quality, flexible, and reliable communication session that includes many more participants compared to conventional systems, as will be explained in further detail below. To provide an overview of various features, functions, and processes the system provides, the following overview discusses a communication session in terms of having two relay devices. In addition, the overview refers to a sending network device, a sending relay device, a receiving relay device, and a receiving network device. The designation of "sending" and "receiving" devices is for purposes of explanation only because each network device and relay device are actually sending and receiving media streams simultaneously to provide a real-time communication session experience to users associated with each of the network devices.

As mentioned briefly above, a network-based communication system ("communication system" or simply "system") can dynamically add or remove relay devices to a communication session during the communication session. For example, the system can establish a communication session with a group of network devices that are each connected to a first relay device. Throughout the communication session, the system can continue to monitor for requests to join the communication session, notifications of network devices leaving the communication session, communication channel characteristics, network device characteristics, or other communication session indicators to determine to dynamically add relay devices or remove relay devices.

For example, upon detecting a request to add an additional network device to the communication session, the system can determine to add a second relay device that is associated with the additional network device. For example, the additional network device may be located in a geographically distinct location compared to the geographic location of the group of network devices associated with the first relay device. Accordingly, the additional network device connects to the second relay device based on the second relay device corresponding to the geographic location of the additional network device. Upon detecting the request for the additional network device to join the communication session, the system adds the second relay device to the communication and generates a relay communication link between the first relay device and the second relay device.

In addition to dynamically adding a relay device based on a network device joining a communication session, the system can, based on a number of factors, determine to add or remove relay devices for a communication session. For example, the system can determine to add or remove relay devices for a communication session based on the number of network devices participating in the communication session (e.g., if the number of network devices connected to a relay device exceeds a threshold), a geographic location or a geographic distance to a relay corresponding to an individual network device, the location of a network device with respect to a local area network (e.g., whether a network device is inside or outside of a local area network that includes a relay device), and/or the connection speed of individual network devices to a particular relay device.

As briefly mentioned above, and as will be explained in greater detail with respect to the Figures, they system dynamically generates a mesh of relay devices on a "as-needed" basis throughout a communication session, where generating the mesh or network of relay devices can include adding and/or removing relay devices as needed. To generate the mesh or network of relay devices, the system sets up relay communication links between each of the active relay devices within a communication session so that each relay device has a relay communication link with each of the other relay devices within a communication session allowing for flexible and efficient use of relay device resources to accommodate a wide-variety of number of participants within a communication session.

For instance, and continuing from the example discussed above regarding the first and second relay devices, based on the system generating the relay communication link, the first relay device provides a group of media streams corresponding to the group of network devices to the second relay device, which then provides the group of media steams to the additional network device that joined the communication session. In turn, the second relay device uses the relay communication link to provide a media steam corresponding to the additional network device to the first relay device, which then provides the media steam corresponding to the additional network device to the group of network devices.

When the principles generally described above with respect to dynamically added relays are applied to a communication session that includes multiple network devices (e.g., 5, 10, 20, 40, 100, or more), the result is a dynamic network-based communication session that the system fluidly optimizes to provide a high quality and reliable communication session. Indeed, because relays can be dynamically added or removed, the system can determine a relay network configuration that provides an optimal communication session, even when properties associated with the communication session are changing (e.g., adding participants, removing participants, adding participants in different geographical locations, and/or changes in communication bandwidth resources). The result is a flexible system that manages a communication session using a dynamic network of relays associated with network devices to optimize the communication quality and reliability of a communication session.

One or more embodiments of the system solve multiple problems found in conventional communication systems. For example, various embodiments of the system resolve technical limitations in conventional systems that rely on a peer-to-peer transfer of media streams. Because each network device in a conventional peer-to-peer system typically sends and receives media streams to and from each participating network device, a network device's computational resources can become overloaded as the number of participating network devices increases, resulting in poor quality and potential reliability problems. Embodiments of the system described in this disclosure resolve this issue by optimizing the number of incoming and outgoing media streams at individual network devices as additional devices are added to a communication session. Additionally, the disclosed system reduces the computational strain on network resources by generating relay communication links that transfer the optimal number of media streams between relays. For example, to optimize a communication session, a network device can determine to provide a single media stream to a relay that forwards the media stream to multiple participating network devices and/or other relay devices. Accordingly, based on the principles described herein, the communication system can reliably facilitate high-quality communication sessions with a large number of participants (e.g., 10, 20, 50, 100, or more).

Similarly, the system overcomes technical limitations of conventional systems that rely on a central mixing unit to receive media streams, mix the media streams, and generate a mixed stream for each network device in a communication session. As explained above, the mixing and generation of a large number of media streams is computationally intensive, and accordingly, conventional systems that rely on a central mixing unit are often limited in the number of participants that can participate in a communication session. The disclosed system overcomes these limitations by determining to dynamically add and remove relays based on optimizing for quality and reliability. Thus, as the system detects that a relay device is approaching capacity or is overburdened, the system can connect a add a relay device to the communication session and connect network devices to the new relay. Indeed, compared to conventional systems that consolidate all of the computational strain in a single central mixing unit, the disclosed system optimally spreads the computational burden among an optimized number of relay devices based on a number of participants, the location of the participants, communication bandwidth of participants, and other factors as further described below.

Additionally, embodiments of the present disclosure overcome technical problems in conventional systems that typically cause conventional systems to be unreliable. In particular, the quality of communication sessions in conventional systems typically rely on the connectivity capabilities of individual network devices. If a network device's connection degrades to the point of poor quality, uselessness, or is simply lost, the network device may unexpectedly drop from the communication session. This issue is magnified when network devices that are located in distant geographical locations must send media streams long distances. Embodiments of the disclosed system resolve these reliability issues by dynamically adding relay devices in geographical locations that optimize the distances over which network devices need to send media streams.

Furthermore, embodiments of the system are more flexible than conventional systems in utilizing bandwidth and processing resources. Unlike many conventional systems that rely on a single network configuration, embodiments of the disclosed communication system are more flexible by dynamically adding and removing relay devices based on communication session characteristics. Accordingly, by adding relays to a communication session, the system can determine how to most efficiently utilize bandwidth resources available to the network devices and relay devices, as well as how to most efficiently use processing resources on the network devices and on the relay devices on an "as-needed" basis. Additional advantages are also apparent based on the below description of the system in reference to the figures.

As illustrated by the foregoing discussion, the present disclosure utilizes a variety of terms to describe features and advantages of the system. Additional detail is now provided regarding the meaning of such terms. As used herein, the term "communication channel" refers to a connection for an electronic transmission between computer devices. For example, a communication channel refers to a logical connection used to convey digital data (e.g., a media stream) from a sending computing device to a receiving computing device. A communication channel can include one or both of a cable (e.g., wired) and broadcast (e.g., cellular and/or wireless) connections. In addition, a communication channel can include various intermediary devices or connections between the two computer devices that the communication channel connects. As used herein, the term communication channel can include digital, multiplexed, simplex, virtual, unicast, multicast, or any other kind of channel known in the art.

As further used herein, the term "relay device" or "relay" generally refers to unit at an intersection within a network. An example of a relay can include a forwarding unit that is connected to multiple network devices and/or other relays via communication channels. A relay connected exclusively to network devices (and not other relays) can simultaneously receive a media stream from one device and forward it to the other connected network devices. In an environment comprising multiple relays, a sending relay that receives media streams from one or more network devices can generate a relay communication link and send the media streams via the relay communication link to one or more other relays. Additionally, a receiving relay can receive media streams from one or more relays and send media streams to one or more connected network devices.

As used herein, the term "relay communication link" refers generally to a specific communication channel for an electronic transmission of data (e.g., media steams) between relay devices within a network. An example of a relay communication link includes a communication channel between relays within a communication session used to transmit media streams. In particular, relay communication links connect relays to other relays within a communication session. In addition, and as described in more detail below, in some embodiments a relay communication link can connect a relay device located within an area network (e.g., a local area network or a wide area network) with a relay device located outside of the area network.

As used herein, the term "media" refers to digital data that may be transmitted over a communication network. Examples of media include, but are not limited to, digital audio, digital video, digital images, digital documents, files, and/or other types of digital data. Accordingly, media may refer to images, video, audio, text, documents, animations, screen sharing, or any other data that may be transmitted over a communication network. In general, media can include user-generated content (e.g., content that a user captures using a media capturing device such as a smart phone or a digital camera) as well as non-user-generated media (e.g., content generated by an entity or third-party).

The term "media stream," as used herein refers generally to a flow of data that is provided over time. An example of a media stream can include a stream of live, near-live, or semi-live media from one network device to one or more other network devices. A media stream can include sending packets of data from one computing device to another computing device. In general, a media stream can include sending images, videos, audio, and/or other data between computing devices. Further, when a computing device provides a media stream, the computing device may encode and/or encrypt a media stream before transmitting the media stream to the one or more other computing devices.

Referring now to the figures, FIG. 1 illustrates a network-based communication system 100 (or simply "system 100") in accordance with one or more embodiments disclosed herein. As illustrated in FIG. 1, the system 100 includes a network device 102 with an nth network device (collectively referred to as "network devices 102"). System 100 also includes application 104 on the network devices 102. The system 100 includes one or more server(s) 106 and a hosted communication service 108 on the one or more server(s) 106. Additionally, as illustrated, system 100 includes relay server 110 with an nth relay server (collectively referred to as "relay servers 110"). Relay server 110 includes relay 112, and each relay server to the nth relay server can include relays to an nth relay. As illustrated, the system 100 includes network 114. In additional embodiments, system 100 includes additional networks.

In one or more embodiments, the network devices 102 may include, but are not limited to, mobile devices (e.g., smartphones, tablets), laptops, desktops, network phones (e.g., VoIP devices), or any other type of computing device, such as those described below in relation to FIGS. 7-8. In one or more embodiments, application 104 is installed as software, hardware, or a combination of software and hardware on network devices 102. In some embodiments, for example, application 104 is implemented across the system 100, where all or part of the software or hardware associated with the application 104 is run on the network device (e.g., network device 102a) and/or server(s) 108. In some embodiments, application 104 is a web-based application executed within a web browser on the network devices 102. In other embodiments, application 104 may be a native application on the network devices 102.

In addition, the server(s) 106 can include, support, or be part of a web server, a program server, an application server, a datacenter, or a combination of server devices as described below in relation to FIGS. 7-8. As further shown in FIG. 1, the server(s) 106 includes a hosted communication service 108. The hosted communication service 108 may facilitate communication between network devices 102 by coordinating communication channels, channel signaling, relay communication links and other items within the system 100. For example, in some embodiments the hosted communication service 108 includes a communication ID database that facilitates the establishment and maintenance of a communication session. As will be explained below, the hosted communication service 108 can receive requests from the relay 112 to join a communication session, retrieves an associated communication ID, and sends, to the relay 112 the associated communication ID along with channel signaling to allow a relay and any associated network devices to participate in a communication session.

As also illustrated in FIG. 1, the server(s) 106, relay servers 110, and network devices 102 are communicably connected through a network 114. In some configurations, the network 114 can be the Internet, an intranet, a private network, or another type of computer network. The network 114 can be a combination of Internet and intranet networks, or any of the networks described below in relation to FIGS. 7-8. Although FIG. 1 illustrates a particular arrangement of components, various additional arrangements are possible. For example, the network devices 102 can communicate directly with the server(s) 106, or can communicate directly with each other, rather than via the network 114. Additionally, as will be discussed in further detail below, the relay servers 110 and network devices 102 can be located within different networks 114.

A user (e.g., a participant in a communication session) can utilize the network device 102, for example, to participate in a communication session with users associated with additional network devices. For instance, the user can use the network device 102 to participate in an audio conference call, a video conference, or other media communication session with additional network devices to the nth network device. To establish and participate in the communication session, the network device 102 communicates with the relay server 110, which sends a request to server(s) 106 to access the hosted communication service 108. The hosted communication service 108 provides information and instructions to allow the relay server 110 to join the communication session by establishing one or more relay communication links with each of the relay servers 110 to the nth relay server involved in the communication session. Accordingly, the system 100 can enable each relay server 110 to establish relay communication links with the other relay servers 110 and communication channels with network devices 102 associated with a particular relay server when initiating and maintaining a communication session.

Figure 2A:
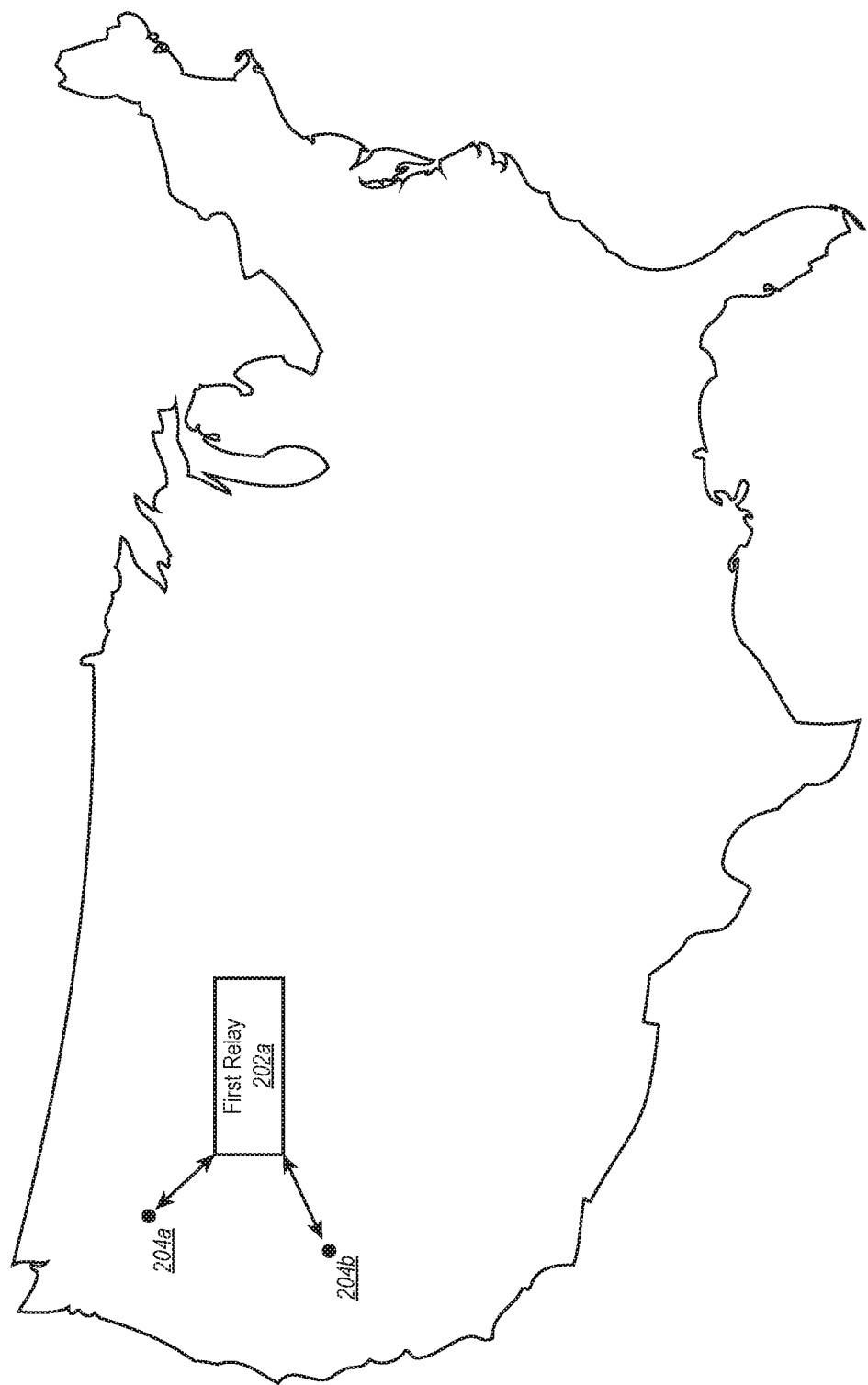
FIG. 2A illustrates example communication channels between multiple network devices and a relay device in accordance with one or more embodiments disclosed herein.
Figure 2B:
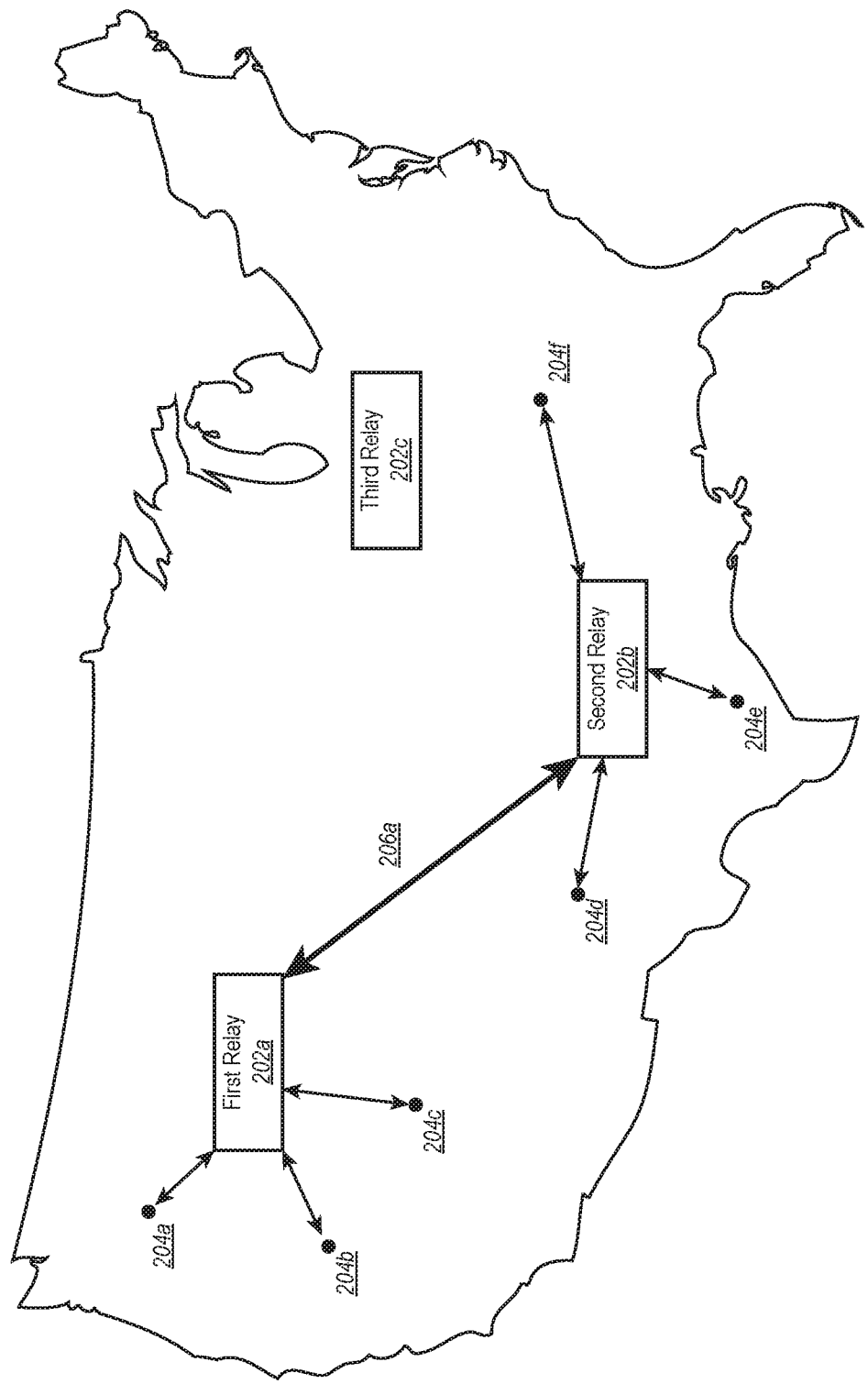
FIG. 2B illustrates example communication channels between multiple network devices and multiple relay devices in accordance with one or more embodiments disclosed herein.
Figure 2C:
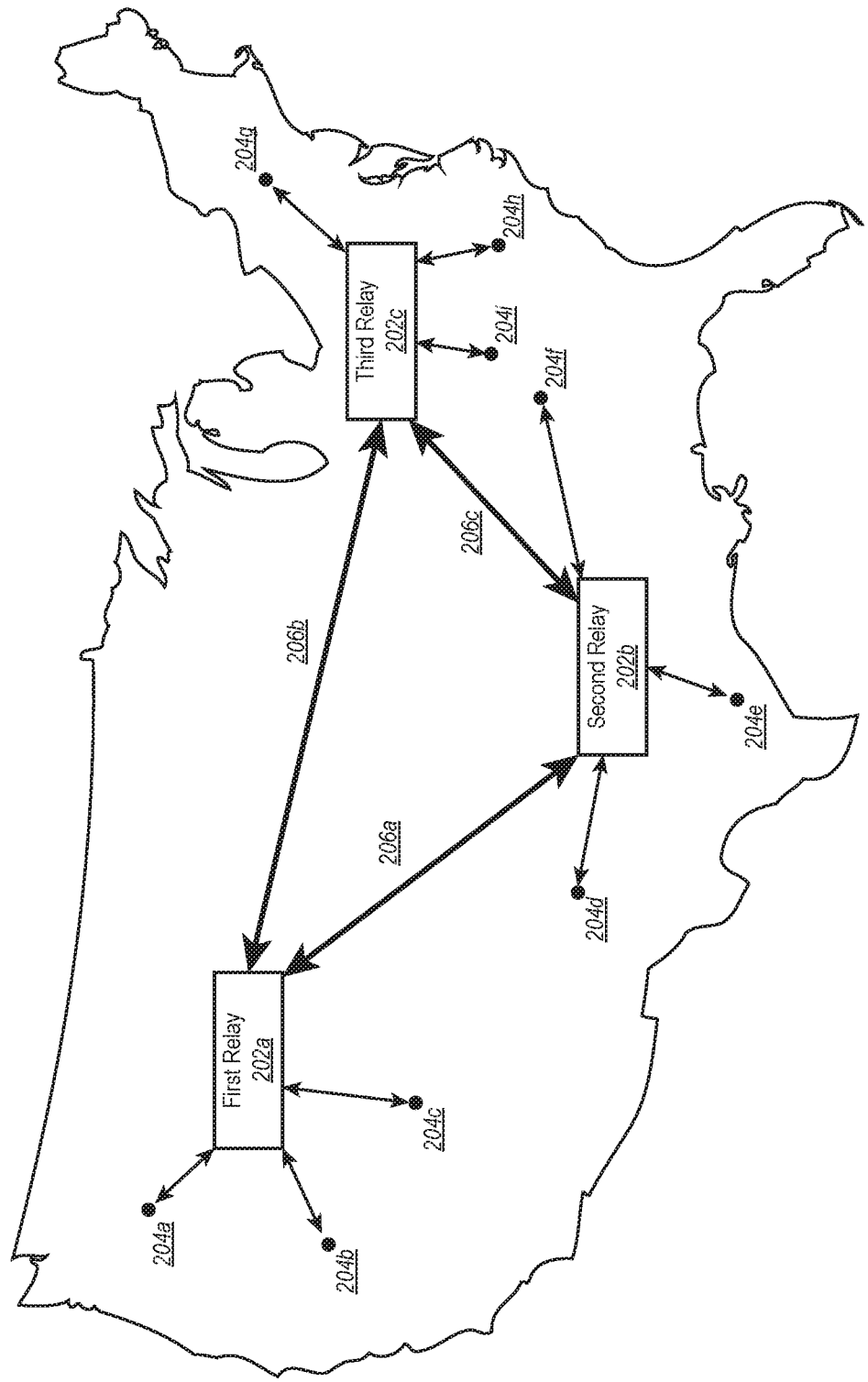
FIG. 2C illustrates yet another example of communication channels between multiple network devices and multiple relay devices in accordance with one or more embodiments disclosed herein.

FIGS. 2A-2C illustrate examples of various communication network configurations as additional network devices and relays join the communication session. In particular, FIGS. 2A-2C illustrate factors used by the system 100 to determine to add additional relays 202 to a communication system. For ease of explanation, the system 100 is described as having a set number of network devices and relays. However, the principles described with respect to FIGS.

2A-2C can be implemented within a system 100 having any number of network devices and relays. Accordingly, and as shown in FIG. 2A, the system 100 includes the network devices 204a and 204b and the first relay 202a participating in a communication session. The system 100, network devices 204, and relays 202 shown in FIGS. 2A-2C can represent the system 100, network devices 102, and relays 112 described above with respect to FIG. 1.

As illustrated in FIGS. 2A-2C, each network device 204 establishes a communication channel with a relay. Communication channels are shown in FIGS. 2A-2C as solid arrows between network devices 204 and relays 202. For example, and as shown in FIG. 2A, the network devices 204a and 204b each connect to the first relay 202a by communication channels. Furthermore, as illustrated in FIGS. 2A-2C, each relay 202 establishes a relay communication link 206 with the other relays 202. For example, as illustrated in FIG. 2B, the first relay 202a is connected to the second relay 202b using relay communication link 206a.

FIG. 2A illustrates an example embodiment of the system 100 in which network devices 204a and 204b establish communication channels with the first relay 202a in a communication session. As illustrated, network device 204a sends a media stream to the first relay 202a via a communication channel, and the first relay 202a forwards the media stream to network device 204b. Likewise, network device 204b sends a media stream the first relay 202a, which then forwards the media stream to network device 204a.

As illustrated, network device 204b is in close geographical proximity to network device 204a, and accordingly, both network device 204a and network device 204b can connect to the same relay 202a. The system 100, however, can determine to add relays based on the geographic location of network devices in relation to each other. More specifically, the system 100 can determine that several network devices are located in a similar geographic region and, in response, connect the network devices to a single relay. For example, as illustrated in FIG. 2A, the system 100 determines that network devices 204a and 204b are in close proximity to each other and accordingly facilitates the creation of the communication channels between the network devices 204a and 204b to the same relay, first relay 202a.

In one or more embodiments, FIG. 2A illustrates a communications session that the system 100 establishes with the first two network devices 204a and 204b. In some cases, and as shown in FIG. 2A, the first two devices 204a 204b to join a communication session may both be associated with a single relay (e.g., the first relay 202a). In other cases, for instance when the network devices 204a and 204b are geographically separated by a greater distance, the system 100 can establish the communication session using two relays. For instance, the network device 204a may connect to the first relay 202a, but then the network device 204b can connect to a second relay (not shown in FIG. 2A), and the system can create a relay communication link between the first relay 202a and the second relay. Accordingly, even when there are only two participating network devices, the system 100 may determine, based on one or more factors, to utilize two relays and generate a relay communication link between the two relays.

Nevertheless, during the communication session illustrated in FIG. 2A, the system may detect a request to add one or more additional network devices to the communication session. FIG. 2B illustrates the same communication session as shown in FIG. 2A with additional network devices 204c, 204d, 204e, and 204f (collectively "network devices 204c-204f") and a second relay 202b. For example, the system 100 can detect a request to join the communication session based on the network device 204c sending a request to join the communication session. As will be discussed in further detail below, in creating and setting up a communication session, the server(s) 106 communicates with each of the first relay 202a and the second relay 202b to provide signaling that allows the first relay 202a and the second relay 202b to maintain the relay communication link 206a. Additionally, while each of the relays monitors the communication channels with their associated network devices and the relay communication links with other relays, the relays receive signaling from the server(s) 106 to obtain the data required to create relay communication links between relays. The process of joining the communication session will be discussed in greater detail below with respect to FIG. 3.

In one or more embodiments, the system 100 determines the geographic location of network devices in a communication session to maximize the efficiency of relay addition. In at least one embodiment, the system can use geolocation software to determine the geographic location of network devices. The geolocation software can utilize network device identifiers, such as IP addresses, to determine the country, city, or postal code of the network device. Additionally, the system can track a network device using GPS technology. More specifically, in at least one embodiment, when a new network device submits a request to a relay to join a communication session, the request includes geolocation data by which the system can determine the geographic location of the network device.

Referring again to FIG. 2B, the system 100 determines the geographic locations of network devices in relation to the first relay 202a and in relation to potential additional relays. For example, as illustrated in FIG. 2B, the system may determine the geographical location of new network devices 204c-204f. Upon determining that the distance between network device 204c and the first relay 202a does not exceed a distance threshold, the system 100 connects network device 204c to the first relay 202a.

In other words, the system optimizes the distance at which network devices send and receive media streams with relays by connecting network devices to relays located within a threshold distance from the network device. For example, based on the network device's 204c location, the network device 204c may initially contact the first relay 202a, and therefore, the system 100 adds the network device 204c to the communication session by facilitating the communication channel between the network device 204c and the first relay 202a. Accordingly, based on characteristics associated with the communication session, the first relay 202a, and/or the network device 204c, the system can determine to add an additional network device to the communication session using an existing relay (e.g., first relay 202a).

In addition to adding an additional network device to an already existing relay device during a communication session, the system 100 can add additional relays to the communication session, for example, based on receiving additional requests to add network devices to the communication session. Based upon determining that the distance between one or more network devices and a relay exceed the distance threshold, the system 100 can determine to add a new relay to the communication session. In particular, the system 100 can favor adding a new relay over connecting the network device to the existing relay. For example, as illustrated in FIG. 2B, the system 100 determines that new network devices 204d-204f are located closer to the second relay 202b than they are to the first relay 202a and, accordingly, connects network devices 204d-204f to the second relay 202b. Again, and as discussed above, addition of the second relay 202b optimizes the distance media streams from network devices 204d-204f must travel to reach the second relay 202b.

As described above with respect to network device 204c, the system 100 facilitates the connection of communication channels for each of network devices 204d-204f and the second relay 202b. Moreover, and as further illustrated in FIG. 2B, the system 100 generates a relay communication link 206a to connect the second relay 202b to the first relay 202a. This communication link allows the first relay 202a and the second relay 202b to efficiently collect media streams from their respective associated network devices, and then provide those media streams to the other relay device.

For example, as illustrated in FIG. 2B, the system 100 causes the first relay 202a to receive media streams from network devices 204a-c and then send those media streams to the second relay 202b, which then provides them to network devices 204d-f. Similarly, the second relay 202b receives media streams from network devices 204d-f and then send those media streams to the first relay 202a, which then provides them to network devices 204a-c. In this way, the system 100 dynamically facilitates adding a relay device to allow each network device in the communication system to only have to send a single media steam to a single relay device and only receive media steams from the single relay device. Moreover, based on various factors (e.g., geographic location of network devices or number of participants already associated with a relay device) the system 100 can add additional relay devices so that no single relay device becomes overloaded with media streams while also making sure that each network device is connecting to a relay device with as good of connection as possible.

In some embodiments, the relay communication link 206a does not transmit all of the media streams from all of the network devices involved in the communication session. For example, if the user associated with network device 204a is only listening in the communication session, the first relay 202a may not send network device 204a video and/or audio media streams to the second relay 202b. In at least one embodiment, the network device 204a determines what media streams to send to the first relay 202a. In at least one other embodiment, the first relay 202a determines which media streams to send to the second relay 202b.

For example, in some communication sessions including webinars, one or more network devices can be associated with a presenter while the other network devices are associated with viewers. In such embodiments, network devices associated with presenters will send, to the relays, audio and video media streams while network devices associated with viewers can determine not to send video or audio media streams. Thus, because the relays receive a subset of media streams from the network devices, the number of media streams that the relays forward through a relay communication link may include a subset of media streams from the network devices.

In addition to using location characteristics associated with network devices to determine to add and/or remove relay devices, the system 100 can monitor communication characteristics (e.g., properties of the communication channel representing quality and reliability) during the communication session for the communication channels with the connected network devices. Based on monitoring the communication channels, the system 100 can determine that adding a new relay would be advantageous (e.g., provide a higher quality communication session, a more reliable connection, etc.). As will be discussed in further detail below, the first relay 202a can provide communication characteristics to the server(s) 106 and the hosted communication service 108 that allows the system to determine that the first relay 202a has reached or exceeded its optimal connective capacity. Based on this determination, when the system 100 adds new network devices to the communication session, the system will add a new relay. The new relay establishes a relay communication link with the original relay, as described above.

The system 100 can determine to add a second relay based on other factors in addition to the geographical distance between network devices and relays. In particular, the system 100 can determine to connect an additional relay when the number of devices connected to an active relay exceeds a device connection threshold. For example, and as illustrated in FIG. 2B, the system 100 can determine that the number of network devices connected to the first relay 202a has exceeded the device connection threshold of three network devices (i.e., three network devices—204a, 204b, and 204c—are connected to the first relay 202a). Accordingly, the system 100 determines to add the second relay 202b to connect to network devices 204d-204f. The system 100 determines the device connection threshold based on the number of devices that can be connected to a relay to optimize the efficiency of relay addition. Though not illustrated, the device connection threshold can consist of any number of network devices (e.g., 5, 10, 20, 30, 40, 50, 100, etc.).

Additionally, the system 100 can also determine to add a second relay based on the connection speed of a network device in the communication session. In particular, if the system detects that the connectivity quality of a network device is below a certain threshold, the system can determine to add an additional relay closer to the network device to increase the connectivity quality for the network device. For example, network device 204f's connection could be impaired to the point where sending media streams to the first relay 202a would cause network device 204f to suffer major quality issues or even drop from the communication session. Therefore, the system may determine to add the second relay 202b. Network device 204f need only send and receive media streams by the communication channel with the second relay 202b instead of sending media streams the greater distance to the first relay 202a. This configuration reduces the round trip time for sending and receiving data packets associated with the media streams.

The system 100 can also determine to dynamically remove relays based on a number of other factors. In particular, if the network devices that are connected to a relay leave the communication session, then the system 100 can determine to remove that relay. For example, if network devices 204d-204f all determine to leave the communication session, then the system 100 can remove the second relay 202b. In addition, if for some reason the connectivity with a particular relay drops below a connectivity threshold, the system 100 can add a new relay the communication session, move the communicational channels from the poor performing relay to the new relay so that the network devices associated with the poor performing relay are now associated with the new relay, and the system can remove the poor performing relay from the communication session. In this way, the system 100 can dynamically move network devices from one relay to another relay consolidate devices to a particular relay, or otherwise remove and add relays to create a customized relay network that is optimized for a specific communication session.

While FIG. 2B illustrates a communication session involving two relays and their associated network devices, FIG. 2C illustrates a communication session involving the same two relays and their associated network devices with an additional third relay 202c. As illustrated by FIG. 2C, the system 100, establishes a network of relay communication links between relays. In particular, FIG. 2C illustrates the first relay 202a, the second relay 202b, and a third relay 202c connected by relay communication links 206a, 206b, and 206c (collectively "relay communication links 206"). The third relay 202c is connected via communication channels to network devices 204g, 204h, and 204i (collectively "network devices 204g-204i"). Though FIG. 2C illustrates a communication session with three relays, other embodiments of the disclosed system can include any number of relays and network devices.

As illustrated by FIG. 2C, the first relay 202a, second relay 202b, and third relay 202c can be located in various geographical locations. In particular, the relays can be located at servers and/or data centers in various geographical locations. In order for a system to automatically add relays as the communication session requires (i.e., the system determines the need to connect an additional relay), the relays must be brought online at some time before the relay is added to the communication session. The system may bring a relay online at a datacenter in a particular location as the system determines that an additional relay at that particular location is required. For example, when network devices 204d-204f signal an intent join the communication session, the system can bring the second relay 202b online.

In at least one other embodiment, the system 100 can preemptively signal to bring relays online based on mode prediction. The system 100 utilizes machine learning to predict peak times of network usage and locations for peak use. The system can also identify certain peak hours for large communication sessions. Based on the identified trend, the system can preemptively signal relays to come online. For example, and as illustrated in FIG. 2B, the system can bring the third relay 202c online even though no network devices connected to the third relay 202c based on mode predictions. Thus, when the users associated with the network devices 204i-204g indicate a desire to join the communication system, the system can automatically connect network devices 204i-204g to the third relay 202c.

As illustrated in FIG. 2C, when the network devices 204i-204g connect to the third relay 202c, the third relay 202c generates a relay communication link 206b that connects to the first relay 202a and a relay communication link 206c that connects to the second relay 202b. Thus, each relay involved in a communication session is connected, via relay communication link, to every other relay in a communication session. In embodiments where more relays are connected in the communication session, each relay generates a relay communication link with each of the other relays to create a full network of relays.

In some embodiments, and as illustrated, when the system 100 adds a new relay, the original relay continues to maintain its connections with its associated network devices. For example, as illustrated in FIG. 2C, although network device 204f is located in closer geographical proximity to the newly added third relay 202c, network device 204f remains connected to the second relay 202b. Thus, the system does not utilize additional computational resources in refreshing the relay communication networks. Rather, when the system establishes associations between a group of network devices and a relay, the group of network devices continues to be associated with the relay, even when more relays are added to the communication session.

In at least one other embodiment, the system can determine whether to maintain the connections with its one or more associated network devices or connect the one or more of associated network devices to the new relay. In one or more embodiments, prior to the relay determining to connect one or more network devices to the new relay, the original relay verifies that the benefit of disconnecting the network device and connecting it to the new relay meets a predefined threshold. Switching communication channels can create minor delays equal to the differences in round trip times between two channels.

As described above with respect to FIGS. 2A-2C, each of the relays 202 continually monitor communication session characteristics so that the system can dynamically add new relays. Thus, based on evolving network conditions (e.g., bandwidth resources, relays 202 capacity, network devices 204 processing capacity, etc.) and evolving communication session characteristics (e.g., adding participants, removing participants, etc.), the relays 202 dynamically determine whether they can connect to additional network devices or not. The system 100 provides a distributed algorithm across all relays 202 that results in a higher quality and more reliable communication session as a whole.

Figure 3:
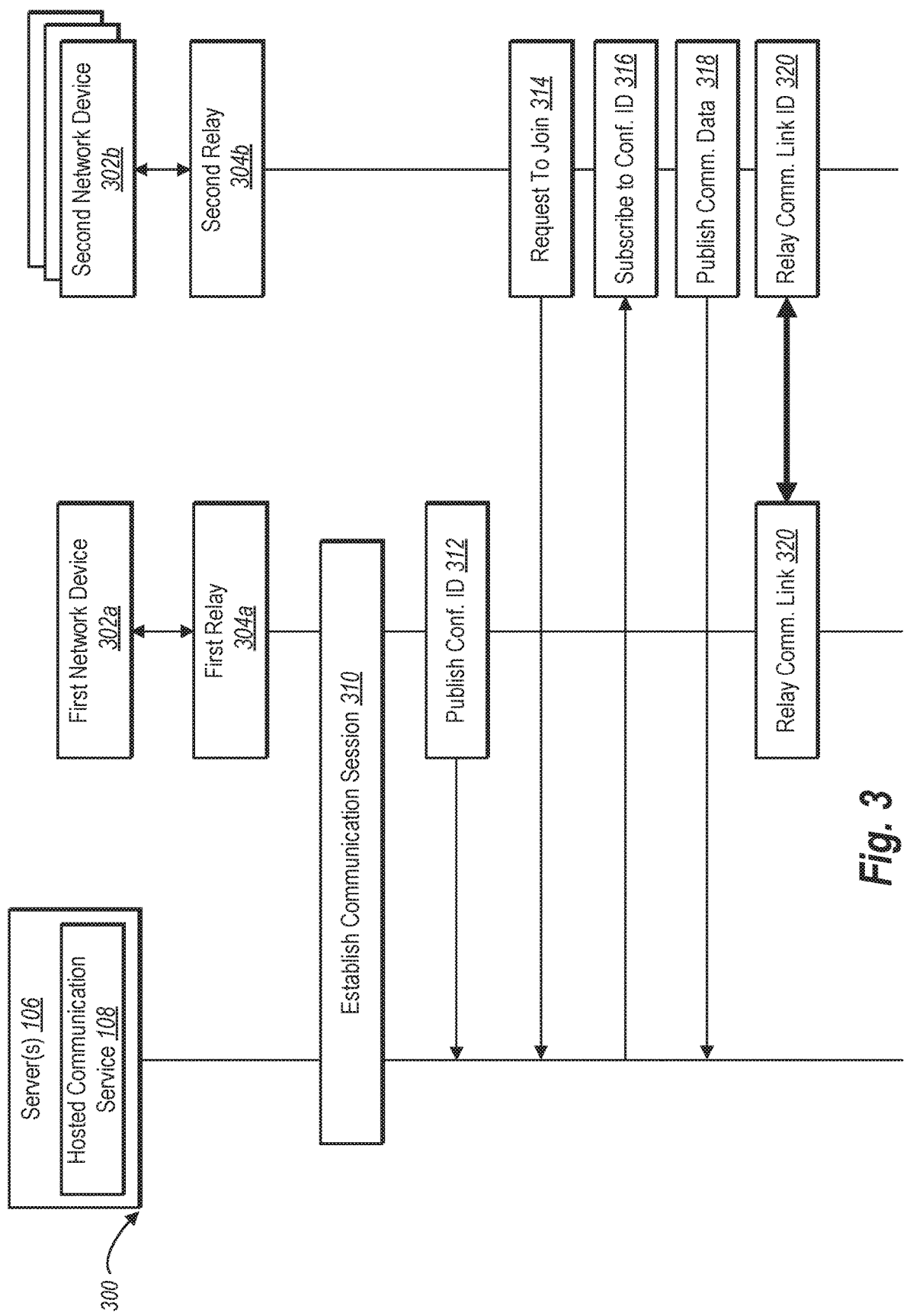
FIG. 3 illustrates an example sequence-flow diagram of establishing and maintaining a communication session in accordance with one or more embodiments disclosed herein.

Additional details regarding the specifics of the distributed algorithm are explained below with respect to FIG. 3. FIG. 3 illustrates a sequence flow 300 demonstrating interactions between server(s) 106, the first relay 304a and the second relay 304b when the system 100 determines to add the second relay 304b to a communication session. As illustrated, the first relay 304a is associated with a first network device 302a. The second relay 304b is associated with a second network device 302b and additional network devices. In particular, FIG. 3 illustrates an example sequence of acts within the system 100 to allow the second relay 304b to join a multi-device communication session. FIG. 3 illustrates only one example and other embodiments of the sequence flow 300 may include any number of additional relays 304 and network devices 302.

In act 310 of FIG. 3, the first relay 304a, which is connected to first network device 302a, establishes a communication session. As part of act 310, the first network device 302a provides a user request to the first relay 304a. The first relay 304a can be a relay that is geographically the closest to the first network device 302a. The first relay 304a receives the user request and sends the request, or a portion of the request, to the server(s) 106. The server(s) 106 assist with establishing the communication channels between the first network device 302a and the first relay 304b. Thus, the first relay 304a can initiate a multi-device communication session involving the network device 302a. As illustrated, only the network device 302a is connected to the first relay 304a in the communication session. The system 100 can employ a WebRTC platform to establish and manage the communication session. For instance, the WebRTC platform can manage signaling between the network devices 302 and the server(s) 106 to generate communication channels between one or more network devices 302 and the first relay 304a. It is understood, based on the disclosure herein, that other RTC platforms and protocols may be used by the system 100.

In act 312 of FIG. 3, the first relay 304a publishes a conference identification 312 (or "conference ID"). As used herein, "communication session identification" means an identifier associated with a communication session. For example, a conference ID can be a string of numbers and characters unique to a particular communication session based on network devices, relays, and/or users within the communication session. In particular, the second relay 302b creates a conference ID unique to the communication session established in act 310. More specifically, the first relay 304a can generate a conference ID with an additional identifier specific to the first network device 302a to prevent generating the same conference ID as one used in another conference.

As part of publishing a communication ID 312, the first relay 304a accesses a set of communication ID stored at the server(s) 106. Based on the communication session data associated with the communication ID, the server(s) 106 can determine whether the generated communication ID is associated with an active communication session or not. When the server(s) 106 detect the first relay's 304a request to establish a communication session 310, the server(s) 106 can associate the communication ID with communication session data for the communication session involving the first relay 304a. Communication session data can include identification of the first relay 304a. Thus, when future relays access the communication ID, they can connect to the communication session involving the first relay 304a.

Additionally, as part of publishing a conference ID 312, the first relay 304a publishes, to the server(s) 106 communication session data. In particular, the first relay 304a publishes communication session data that includes data required for a relay to establish a relay communication links with the first relay 304a. For example, communication session data can include the identifier and address of the first relay 304a and of the first network device 302a. Therefore, when the first relay 304a publishes the conference ID 312, the first relay associates the conference ID with relevant communication session data so that other relays can connect to the first relay 304a. A relay that is joining a communication session can access communication session data for a particular communication session by looking up the communication ID.

In act 314 of FIG. 3, the second relay 304b requests to join the communication session involving the first relay 304a. As part of act requesting to join the communication session 314, the second network device 302b and any additional network devices provide user requests to the second relay 304b. The second relay 304b receives the user requests and sends the request, or a portion of the request, to the server(s) 106. The server(s) 106 can assist with establishing communication channels between the second relay 304 and each of the second network device 302b and the additional network devices. Thus, the network devices connected to the second relay 304b can send and receive media streams from each other through the second relay 304b.

In act 316 of FIG. 3, the second relay 304b subscribes to the conference ID 316. In other words, the second relay 304b uses the conference ID generated by the first relay 304a to access the communication session data associated with the communication session involving the first relay 304a. In particular, the second relay 304b accesses the communication data associated with the communication session by looking up the conference ID. Based on the retrieved communication data, which includes information about the first relay 304a and the communication session, the second relay 304b has the data required to generate a relay communication link with the first relay 304a.

As part of subscribing to the conference ID 316, the second relay 304b can store the communication session data associated with the conference ID. In situations where multiple network devices send, to the second relay 304b, requests to join the communication session, storing the communication session data at the second relay 304b reduces the number of times that the second relay must access the communication ID at the server(s) 106. For example, if the second relay 304b stores the communication session data associated with a communication ID, when an nth network device requests to join the communication session, the second relay 304b, the second relay 304b can connect the nth network device in the communication session without additional signaling from the server(s) 106.

In act 318 of FIG. 3, the second relay 304b publishes communication data. In a similar process to how the first relay 304a publishes communication session data in act 312, the second relay 304b associates additional communication session data with the conference ID. In particular, the second relay 304b updates communication session data that identifies the second relay 304b as a participant in the communication session. Additionally, the updated communication session data also includes an identifier and address for the second relay 304b, the associated second network device 302b, and additional network devices.

In act 318 of FIG. 3, the second relay 304b publishes communication session data 318 to the server(s) 106. Primarily, the second relay 304b sends, to the server(s) 106 additional data to be associated with the conference identification (or "conference ID"). For example, the second relay 304b can publish that the second relay 304b is involved in the communication session, an address for the second relay 304b, and/or a second relay identifier. The server(s) 106 records this data in the database storing the set of conference identifications. Thus, when additional relays submit requests to join the communication session, the additional relays can access the communication data relating to both the first relay 304a and the second relay 304b.

In act 320 of FIG. 3, the second relay 304b establishes a relay communication link with the first relay 304a. In particular, the second relay uses the communication data received from the server(s) 106 to establish the relay communication link with the first relay 304a. In response to detecting that the second relay 304b has established a relay communication link with the first relay 304a, the first relay 304a establishes a relay communication link with the second relay 304b. Once the relay communication links have been established, the first relay 304a and the second relay 304b can send and receive media streams to and from each other.

Figure 4B:
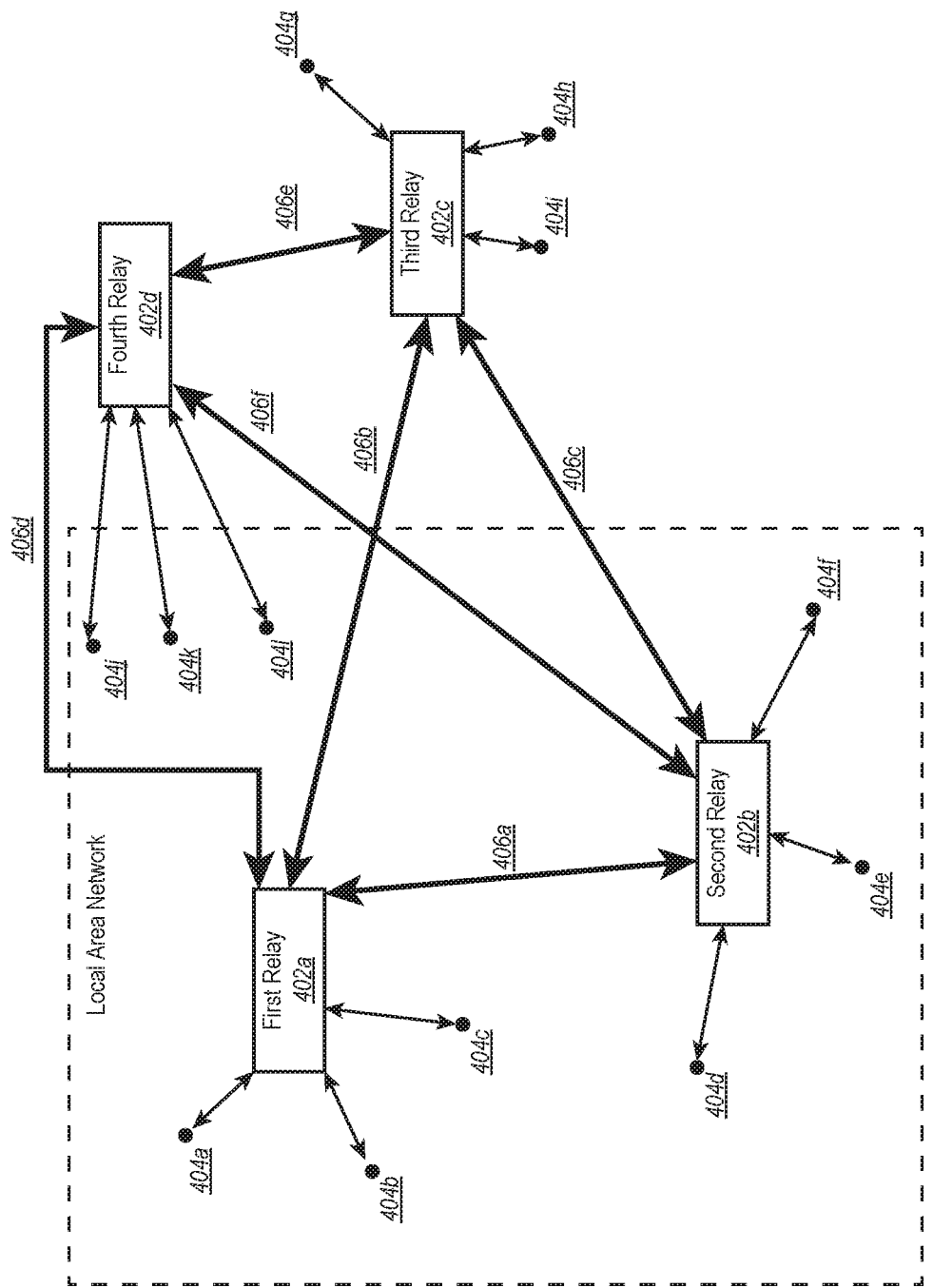

Turning now to FIGS. 4A-4B, FIGS. 4A-4B illustrate an example of communication channels between multiple network devices and multiple relays located inside and outside a local area network, which is illustrated with a dotted line. FIGS. 4A-4B illustrate network devices 404a-404f, first relay 402a, second relay 402b, and network devices 404j-404l located within a local area network. In contrast, network devices 404g-404i and third relay 402c are located outside of the area network. In FIG. 4A, all the network devices except network devices 404j-404l are connected in a communication session. FIG. 4B illustrates the configuration of communication channels when network devices 404j-404l connect to a fourth relay 402d located outside of the local area network.

As illustrated in FIG. 4A, network devices 404a-404f and network devices 404j-404l are located within a local area network. However, in at least one other embodiment, the local area network illustrated in FIGS. 4A-4B can represent any other area network. As used herein, the term "area network" means a computer or data network which allows nodes to share resources. In particular, area network means a computer network that has components at different scales. For example, an area network can include an ad hoc network, a personal area network ("PAN"), a local area network ("LAN"), a wide area network ("WAN"), a metropolitan area network ("MAN"), or one or more portions of the Internet or a combination of two or more of these. In at least one embodiment, the illustrated area network represents local area networking within a home, school, or office.

As further illustrated in FIG. 4A, the first relay 402a and the second relay 402b are connected via relay communication link 406a. Relay communication link 406a operates between the first relay 402a and the second relay 402b within the local area network. In particular, relay communication link 406a can utilize in-network resources to send media streams between the first relay 402a and the second relay 402b. In contrast, the third relay connects to the first relay 402a via relay communication link 406b and to the second relay 402b via relay communication link 406c. Relay communication link 406b and relay communication link 406c span the local area network boundary. In particular, relay communication links 406b and 406c can utilize a combination of in-network resources and/or out-of-network resources.

If the number of devices connected to a relay has reached the relay's device connection threshold, then the system connects new network devices to alternate relays. As used herein, the term "device connection threshold" refers to a number of devices to which a relay can reliably connect. In particular, the device connection threshold is the maximum number of network devices that can connect to a relay while still maintaining optimal communication session quality. For example, in FIG. 4A, the first relay 402a and the second relay 402b may have reached their device connection thresholds of three devices each. As illustrated in FIG. 4A, the system can determine that the number of network devices connected to each of the first relay 402a and the second relay 402b have both met and/or exceeded the device connection thresholds of the respective relays.

As illustrated in FIG. 4A, the network devices 404j, 404k, and 404l (collectively "network devices 404j-404l") may indicate a desire to join the communication session. As illustrated, the system can determine that, in order to optimize the expenditure of computational resources, a particular relay (e.g., the first relay 402a) cannot connect to additional network devices. Connecting to the first relay 402a could be potentially beneficial because it is geographically the closest relay and located within the same local area network as the network devices 404j-404l. However, though connecting the network devices 404j-404l to the first relay 402 possesses many potential benefits, the system determines not to connect the network devices 404j-404l to the first relay 402a because that relay is at its connection threshold. Additionally, as illustrated, though connecting the network devices 404j-404l to the second relay 402b might provide benefits of connecting to a relay within the same local area network, the system also determines that the second relay 402b has met its device connection threshold.

When in-network relays have met or exceeded their device connection thresholds, the system can determine to connect additional network devices 404j-404l to other available relays within the area network or even relays located outside of the area network. Though not illustrated, if the area network contains an additional relay, the system could determine to connect network devices 404j-404l to the in-network relay. However, as illustrated, the area network does not contain additional relays. Therefore, in order to join the communication session, the network devices 404j-404l must connect to relays outside of the local area network.

As discussed above, the system can determine to add a new out-of-network relay based on a number of factors. For example, the distance between network devices 404j-404l and the third relay 402c can meet or exceed a distance threshold. Third relay 402c has also met or exceeded its device connection threshold. Based on these and other considerations, the system can determine to connect network devices 404j-404l to a new relay that is located outside of the area network.

FIG. 4B illustrates the network devices 404j-404l joining the communication session. Network devices 404j-404l connect to fourth relay 402d, which is located outside the local area network. When the network devices 404j-404l connect to the fourth relay 402d, the fourth relay 402d establishes relay communication link 406d with the first relay 402a, relay communication link 406f with the second relay 402b, and relay communication link 406e with the third relay 402c. The fourth relay 402d sends and receives media streams to the first relay 402a, the second relay 402b, and the third relay 402c through the respective relay communication links.

Though not illustrated, in at least one other embodiment, network devices that are located outside of a local area network can connect to relays within the area network. In particular, in some embodiments, relays within a local area network may associate access with some access control. For example, if the local area network is an office network, the system can limit access to the in-network relay to network devices also within the local area network. The system can utilize a network access control method to restrict the availability of in-network relays from out-of-network network devices.

Figure 5:
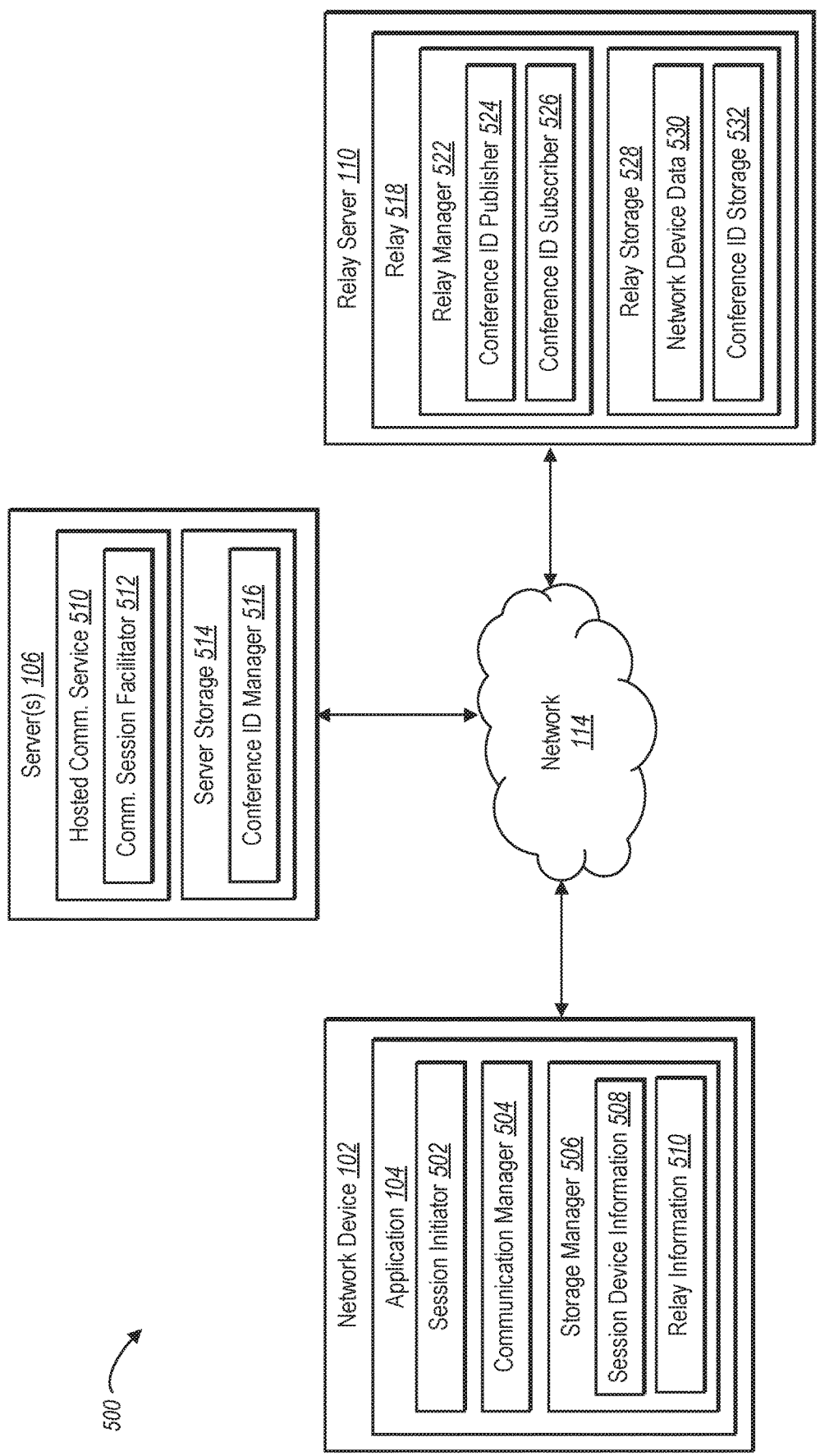
FIG. 5 illustrates a schematic diagram of an example a network-based communication system in accordance with one or more embodiments disclosed herein.

FIG. 5 illustrates an exemplary network-based communication system 500 (hereinafter "system 500") according to principles described herein. The system 500 may be one example configuration of the system 100 described in connection with FIGS. 1-4. As illustrated, the system 500 includes the network device 102 connected to the server(s) 106 and the relay server 110 via the network 114. The network device 102 includes application 104 that includes a session initiator 502, a communication manager 504, and a storage manager 506 that stores session device information 508 and relay information 510.

In general, the session initiator 502 facilitates the establishment of a communication session between users, such as a multi-device communication session. For example, the session initiator 502 may initiate audio, video, instant messages, unified, and other types of communication sessions between one or more users associated with network devices. The session initiator 502 may employ protocol, such as SIP or WebRTC, in facilitating communication sessions. Further, the session initiator 502 can facilitate multi-device communication session between the first network device 102a and two or more other network devices.

In one or more embodiments, the session initiator 502 can receive a request to initiate a multi-device communication session. For example, a user may indicate a desire to communicate with other users in a conference call via the network device 102. The request from the user can include identification information for other users with whom the user desires to communicate, which the session initiator 502 can use to establish the multi-device communication session.

The communication manager 504 monitors communication as well as sends and receives media streams. The communication manager 503 can send and receive media streams from other network devices. For instance, if a user associated with the network device is part of a conference call involving five other network devices, the communication manager 504 can send five media streams, one to each of the other users. The communication manager 504 can also receive five media streams corresponding to the five other users. Alternatively, the communication manager 504 can receive media streams from one or more network devices through the relay 418.

The communication manager 504 can also send media streams from relays 418. In particular, the communication manager 504 sends media streams to other network devices via relays. For example, if the network device 102 is participating in a multi-device communication session, the communication manager 504 sends one media stream to an associated relay 518 in the communication session. The relay 518 then forwards one media stream to each of the one or more other relays 518 involved in the communication session. Each of the one or more other relays then multiply the received media streams and forwards one media stream to each of their associated receiving network devices.

The communication manager 504 can also receive media streams from relays 518. For example, the communication manager 504 can receive one or more media streams from a connected relay 518 in a multi-device communication session. For example, if the network device 102 is participating in a communication session with five other network devices via relay servers, the communication manager 504 receives five media streams from its associated relay 518.

In one or more embodiments, the communication manager 504 monitors communication channels with the other network devices during a multi-device communication session. For example, the communication manager 504 can monitor the connection quality and status of peer-to-peer communication channels in a communication session and determine to switch from peer-to-peer communication channels to relay communication channels.

The network device 102 also contains storage manager 506. In some embodiments, the storage manager 506 saves information corresponding to each network device participating in a multi-device communication session. For example, the communication manager 504 stores session device data 508 in storage manager 506. Session device data 508 can include connection information for each network device in the multi-device communication session, such as the address of each network device as well as an identifier corresponding to each network device. As such, if the first network device 102a does become temporarily disconnected from one or more network devices in a multi-device communication session, the communication manager 504 can use the session device data 508 to reconnect to each network device. The communication manager 504 can also use the session device data 508 to verify the identity of a network device that was temporarily disconnected from a multi-device communication session with the first network device 102a.

Additionally, storage manager 506 also saves information corresponding to the relay associated with the network device 102. Relay information 510 can include connection information for an associated relay server. For example, relay information 510 can include the address of the geographically closest relay server as well as an identifier corresponding to the closest relay server. Because the storage manager 506 maintains this information, when a network device wishes to connect to a communication session, the network device can directly connect to the associated relay server. Additionally, storage manager 506 can store information regarding alternative relay servers in case the closest relay server is unavailable.

As further illustrated in FIG. 5, the server(s) 106 include the hosted communication service 510 that includes a communication session facilitator 512. In addition, the server(s) 106 can include server storage 514 which includes conference ID manager 516. The communication session facilitator 512 can assist in establishing and maintaining a communication session between relays. For example, the communication session facilitator 512 sends and receives signals from relays in a communication system. More specifically, the communication session facilitator 512 can receive, from a relay, a request to join a communication session. Based on the request to join, the communication session facilitator can respond by sending the communication session data the joining relay needs to establish relay communication links with the other relays.

The server storage 514 stores the communication session data needed to connect network devices in communication sessions. In particular, the conference ID manager 516 stores a set of conference IDs and the communication session data that is associated with each conference ID. The conference ID manager 516 organizes and stores conference ID data received from relays. In particular, the conference ID manager stores a set conference IDs comprising the conference IDs of all active communication sessions. The conference ID manager 516 stores conference IDs and associates the conference IDs with communication session data. For instance, communication session data includes addresses and identifiers for all relays that are connected within the communication session. Additionally, when additional relays subscribe to particular conference IDs, the conference ID manager 516 adds data regarding the additional relays to the communication session data. When a relay leaves the communication session, the conference ID manager removes the relay's information from the communication session data.

As further illustrated in FIG. 5, the relay server 110 includes the relay 518. The relay 518 includes relay manager 522 and relay storage 528. Relay manager 522 includes conference ID publisher 524 and conference ID subscriber 526. Additionally, relay storage 528 includes network device data 530 and conference id storage 532. The relay server 110 can be a computer program or device that provides functionality for other client programs or devices. In particular, the relay servers 110 can comprise servers in multiple geographic locations. Relays 518 can be located on the relay server 110.

The relay 518 illustrated in FIG. 5 represents an ephemeral relay located on relay server 110. In particular, the system adds relay 518 when the system determines there is a need for the relay 518 either preemptively or after network device 102 attempts to join communication session. Additionally, the system can determine to add relays 518 on relay servers 110 located in various geographical areas. The system can also remove relay 518 from the communication session when the system determines that the relay 518 is not being utilized in a communication session (e.g., when all network devices connected to the relay 518 have left the communication session).

The relay manager 522 manages and maintains communication sessions between one or more relays 518 by sending and receiving media streams. The manager 522 can receive media streams from connected network devices and forward one media stream from each connected network device to each connected relay. Additionally, a receiving relay 518 can receive a media stream from a sending relay 518, determine the number of network devices 102 connected to the receiving relay 518, multiply the media stream to equal the number of connected network devices, and send one media stream to each connected network device. Because network devices 102 send and receive media streams from relay servers 110, the round trip time between network device and relay server is often shorter than the round trip time between network devices.

Additionally, the relay manager 522 sends and receives signals from the network devices 102. For instance, when the user of a network device 102 indicates the intent to begin or join a communication session, the network device 102 signals, to the relay manager 522. Thus, when the network device 102 is involved in the communication session, the network device 102 signals the relay 518.

The relay manager 522 also sends and receives signals from the server(s) 106. In particular, the relay manager 522 sends, to the server(s) 106 the network device 102 request to initiate or to join a communication session. Additionally, the relay manager 522 sends the communication session data of the relay 518 to be stored at the server(s) 106. The relay manager 522 also receives communication session data from the server(s) 106.

As part of signaling with the server(s) 106, the conference ID publisher 524 generates a conference ID, associates the conference ID with communication session data, and publishes communication session data to the server(s) 106 when the network device 102 begins or joins a communication session. For example, when relay 518 initiates a communication session, the conference ID publisher 524 generates a conference ID that is unique to the communication session and to the relay 518. The conference ID publisher 524 then publishes the conference ID and the associated communication session data to the server(s) 106. The communication session data can include the network device's involvement in the communication session, the network device's address, and/or other information required for other relays to connect to the relay 518.

In instances where the relay 518 joins an existing communication session, the conference ID publisher 524 associates additional communication session data with the conference ID at the server(s) 106. In particular, the conference ID publisher 524 accesses the conference ID at the server(s) 106. Based on identifying that the conference ID is associated with communication session data, the conference ID publisher 524 publishes additional communication data to the server(s) 106.

In cases where the relay 518 determines to leave the communication session, the conference ID publisher 524 updates the communication session data to indicate that the relay 518 is no longer involved in the communication session. For example, if the network device 102 connected to the relay 518 disconnects from the communication session, the conference ID publisher 524 updates the communication session data to remove the relay 518 from the communication session.

As illustrated in FIG. 5, the conference ID subscriber 526 retrieves communication session data associated with a particular conference ID. In particular, the conference ID subscriber 526 accesses the conference ID at the server(s) 106. The conference ID subscriber retrieves the communication session data that allows the relay 518 to identify, locate, and connect with other relays via relay communication link.

As further illustrated in FIG. 5, the relay 518 includes relay storage 528 which includes network device data 530 and conference ID storage 532. As discussed above, the relay 518 can assist in establishing and maintaining a communication session between network devices and relays. As part of facilitating the communication session, relay storage 528 stores data about network devices connected to the relay 518. In particular, network device data 530 can store data that identifies the network devices connected to the relay 518 and includes network device location and other information. In addition, the relay 518 stores conference IDs and their associated communication session data 532 at the conference ID storage 532. The data stored in the conference ID storage 532 enables the relay 518 to connect to the other relays connected within the communication session.

Figure 6:
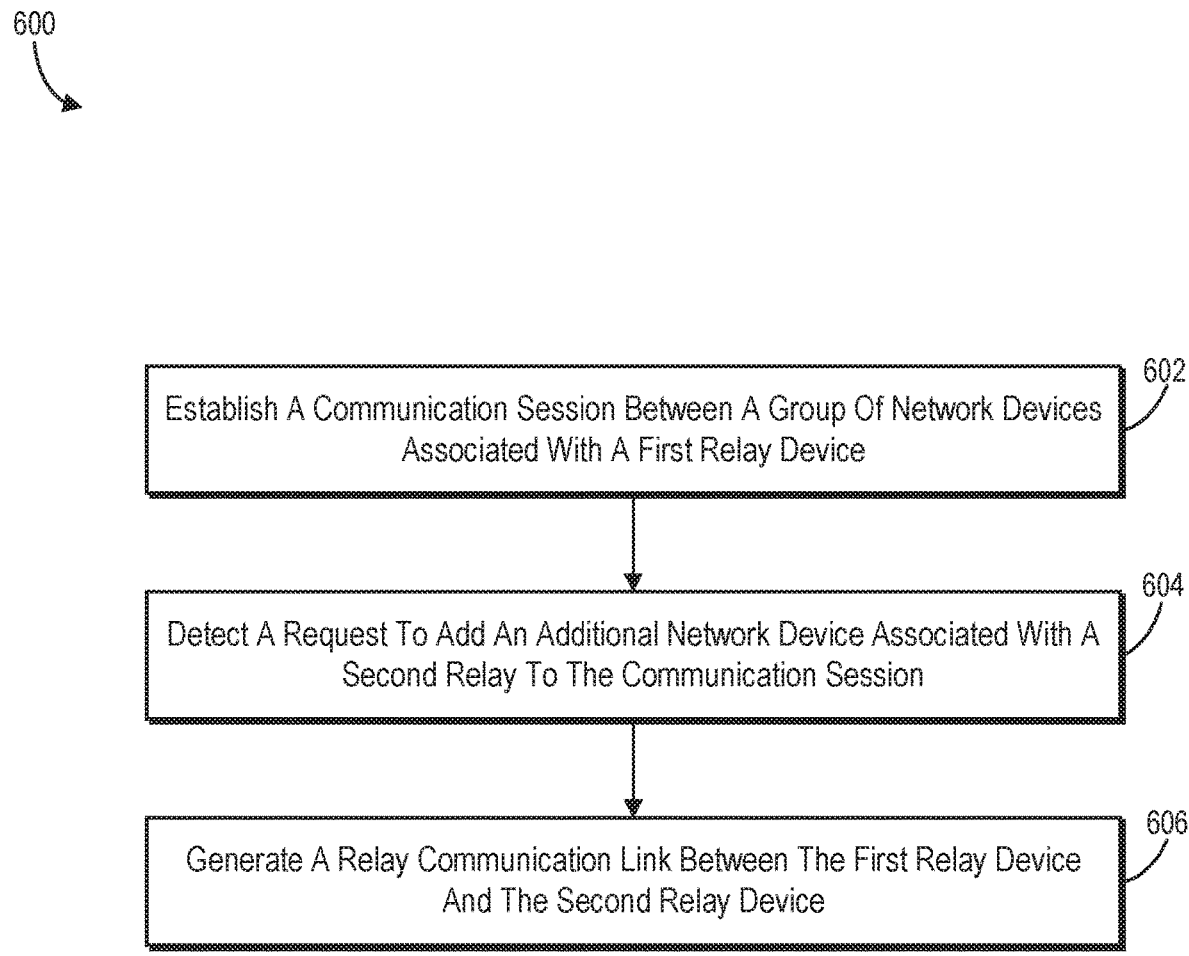
FIG. 6 illustrates an example flowchart of a series of acts for providing a multi-device communication session in accordance with one or more embodiments disclosed herein.

FIGS. 1-5, the corresponding text, and the examples, provide a number of different systems and devices for providing a network-based communication system. In addition to the foregoing, embodiments also can be described in terms of flowcharts comprising acts and steps in a method for accomplishing a particular result. Turning now to FIG. 6, this figure illustrates a flowchart of a series of acts 600 of providing a communication session in accordance with one or more embodiments described herein. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer-readable medium can comprise instructions, that when executed by one or more processors, cause a computing device to perform the acts of FIG. 6. In still further embodiments, a system can perform the acts of FIG. 6.

As shown in FIG. 6, the series of acts 600 can include act 602 of establishing a communication session between a group of network devices associated with a first relay device. In particular, act 602 can include establishing, by the network-based communication system, a communication session between a group of network devices, wherein each network device from the group of network devices is associated with a first relay device. Furthermore, act 602 of FIG. 6 can include enabling, by the network-based communication system, each network device from the group of network devices to send a media stream to the first relay causing the first relay device to receive a group of media streams corresponding to the group of network devices, and enabling, by the network-based communication system, the first relay device to send a subset of media streams from the group of media streams to each network device from the group of network devices.

In addition, the series of acts 600 can include act 604 of detecting a request to add an additional network device associated with a second relay to the communication session, as illustrated in FIG. 6. For example, act 604 can include detecting, by the network-based communication system and during the communication session, a request to add an additional network device to the communication session, the additional network device associated with a second relay device. Act 604 can also include determining that a number of network devices in the group of network devices associated with the first relay exceeds a device connection threshold.

Moreover, the series of acts 600 shown in FIG. 6 can include act 606 of generating a relay communication link between the first relay device and the second relay device. For instance, act 606 includes generating, by the network-based communication system and based on the request to add the additional network device to the communication session, a relay communication link between the first relay device and the second relay device to enable communication between the group of network devices associated with the first relay device and the additional network device associated with the second relay device.

Act 606 can also include enabling the first relay device to send the group of media streams corresponding to the group of network devices to the second relay device via the relay communication link. Moreover, act 606 can include enabling the second relay device to send an additional media stream corresponding to the additional network device to the first relay device via the relay communication link. Furthermore, act 606 can include causing the first relay device to provide the additional media steam corresponding to the additional network device to each network device in the group of network devices associated with the first relay device. Additionally, act 606 can include causing the second relay device to provide the group of media streams corresponding to the group of network devices to the additional network device associated with the second relay device.

Series of acts 600 can include additional acts. For example, series of acts 600 can include associating the second relay device with the additional network device based on determining that a number of network devices in the group of network devices associated with the first relay exceeds a device connection threshold. In some embodiments, the series of acts 600 can include associating the second relay device with the additional network device based on determining that a geographical distance between the first relay device and the additional network device exceeds a distance threshold.

Moreover, the series of acts 600 can include detecting, during the communication session, a request to add a second additional network device associated with a third relay device to the communication session; generating, during the communication session, a second relay communication link between the first relay device and the third relay device to enable communication between the group of network devices associated with the first relay device and the second additional network device associated with the third relay device; and generating, during the communication session, a third relay communication link between the second relay device and the third relay device to enable communication between the additional network device associated with the second relay device and the second additional relay device associated with the third relay device.

Additionally, series of acts 600 can include detecting, during the communication session, that the additional network device left the communication session, and removing, in response to detecting that the additional network device left the communication session, the relay communication link between the first relay device and the second relay device while maintaining the communication session between the group of network devices associated with the first relay device. In some embodiments, the first relay device is located within a local area network and the second relay device is located outside of the local area network. Moreover, in some instances, the group of network devices are located within the local network, and the additional network device is located outside the local network.

Figure 7:
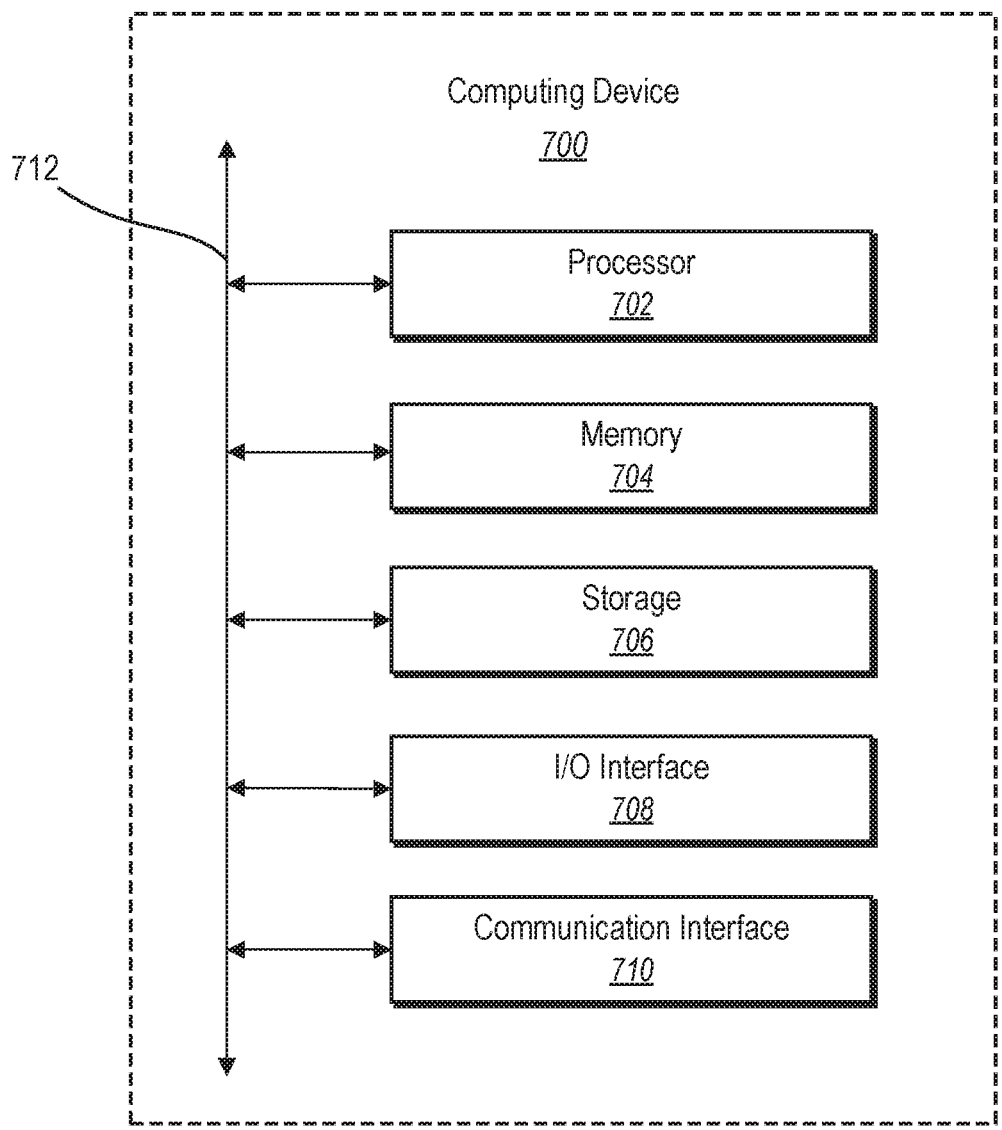
FIG. 7 illustrates a block diagram of an example computing device in accordance with one or more embodiments disclosed herein.

FIG. 7 illustrates, in block diagram form, an exemplary computing device 700 that may be configured to perform one or more of the processes described above. One will appreciate that system 100, and/or VoIP system 200 each comprises one or more computing devices in accordance with implementations of computing device 700. As shown by FIG. 7, the computing device can comprise a processor 702, a memory 704, a storage device 706, an I/O interface 708, and a communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example, to execute instructions processor 702 may retrieve (or fetch) the instructions from an internal register, an internal cache, memory 704, or storage device 706 and decode and execute them. In particular embodiments, processor 702 may include one or more internal caches for data, instructions, or addresses. As an example, processor 702 may include one or more instruction caches, one or more data caches, and one or more translation lookaside buffers ("TLBs"). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as random access memory ("RAM"), read only memory ("ROM"), a solid-state disk ("SSD"), flash, phase change memory ("PCM"), or other types of data storage. Memory 704 may be internal or distributed memory.

Storage device 706 includes storage for storing data or instructions. As an example, storage device 706 can comprise a non-transitory storage medium described above. Storage device 706 may include a hard disk drive ("HDD"), a floppy disk drive, flash memory, an optical disc, a magneto-optical disc, magnetic tape, or a universal serial bus ("USB") drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In other embodiments, Storage device 706 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example, communication interface 710 may include a network interface controller ("NIC") or network adapter for communicating with an Ethernet or other wire-based network or a wireless NIC ("WNIC") or wireless adapter for communicating with a wireless network, such as WI-FI.

Additionally or alternatively, communication interface 710 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 710 may facilitate communications with a wireless PAN ("WPAN") (such as, for example, a BLUETOOTH WPAN), a WI-FI network, a WI-MAX network, a cellular telephone network (such as, for example, a global system for mobile communications ("GSM") network), a satellite network, a navigation network, a broadband network, a narrowband network, the Internet, a local area network, or any other networks capable of carrying data and/or communications signals between a network device 102 and one or more servers 108.

To illustrate, the communication interface may communicate using any communication platforms and technologies suitable for transporting data and/or communication signals, including known communication technologies, devices, media, and protocols supportive of remote data communications, examples of which include, but are not limited to, data transmission media, communications devices, transmission control protocol ("TCP"), internet protocol ("IP"), file transfer protocol ("FTP"), telnet, hypertext transfer protocol ("HTTP"), hypertext transfer protocol secure ("HTTPS"), session initiation protocol ("SIP"), simple object access protocol ("SOAP"), extensible mark-up language ("XML") and variations thereof, simple mail transfer protocol ("SMTP"), real-time transport protocol ("RTP"), user datagram protocol ("UDP"), global system for mobile communications ("GSM") technologies, enhanced data rates for GSM evolution ("EDGE") technologies, code division multiple access ("CDMA") technologies, time division multiple access ("TDMA") technologies, short message service ("SMS"), multimedia message service ("MIMS"), radio frequency ("RF") signaling technologies, wireless communication technologies, in-band and out-of-band signaling technologies, and other suitable communications networks and technologies.

Communication infrastructure 712 may include hardware, software, or both that couples components of computing device 700 to each other. As an example and not by way of limitation, communication infrastructure 712 may include an accelerated graphics port ("AGP") or other graphics bus, an enhanced industry standard architecture ("EISA") bus, a front-side bus ("FSB"), a hypertransport ("HT") interconnect, an industry standard architecture ("ISA") bus, an infiniband interconnect, a low-pin-count ("LPC") bus, a memory bus, a micro channel architecture ("MCA") bus, a peripheral component interconnect ("PCI") bus, a PCI-Express ("PCIe") bus, a serial advanced technology attachment ("SATA") bus, a video electronics standards association local ("VLB") bus, an InfiniBand bus, or another suitable bus or a combination thereof.

Figure 8:
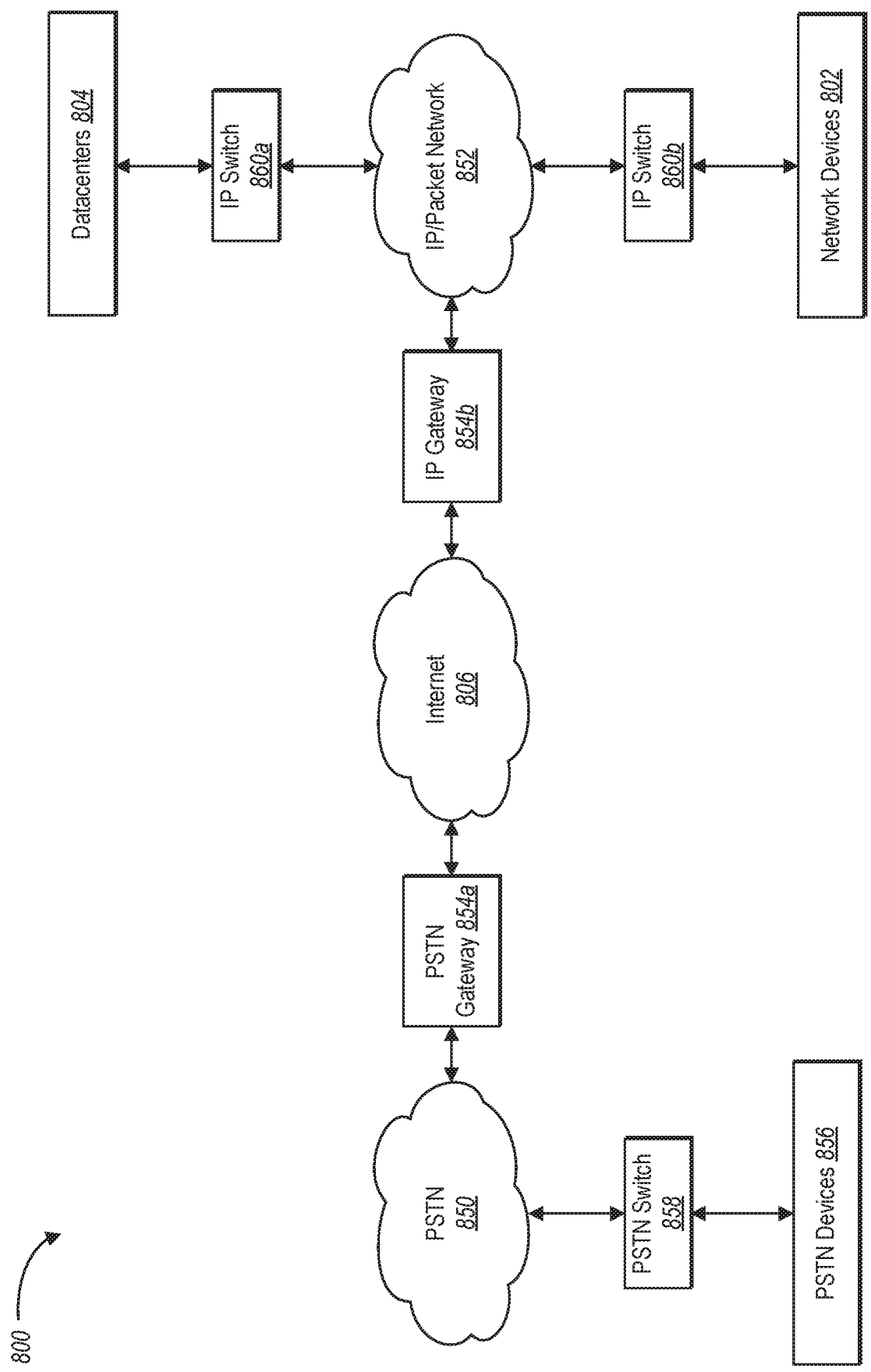
FIG. 8 illustrates an example network environment of a network-based communication system in accordance with one or more embodiments disclosed herein.

FIG. 8 illustrates an example network environment of a telecommunications system 1100 according to the principles described herein. In particular, the telecommunications system 800 may facilitate both network-based communication systems as well as circuited-switched traditional communication systems. For example, the telecommunications system 800 may allow a user calling from a traditional landline to converse with a user using a VoIP device. In addition, while FIG. 8 illustrates exemplary components and devices according to one embodiment, other embodiments may omit, add to, reorder, and/or modify any of the components and devices shown in FIG. 8.

The telecommunication system 800 may include a PSTN 850 and an IP/packet network 850. The PSTN 850 and the IP/packet network 852 may be connected via a network, such as the Internet 806, intranet, or over a private network. In some configurations, the PSTN 850 and/or the IP/packet network 852 may be connected to the Internet 806 via a PSTN gateways 854*a* or an IP gateway 854*b*. For example, gateway 854*b* may be a signaling gateway and/or a media gateway. For instance, the signaling gateway processes and translates bidirectional SIP signals, and the media gateway handles real-time transport protocol communications. In addition, network trunks may interconnect the PSTN 850, the Internet 806, and the IP/packet network 850.

The PSTN 850 may connect to one or more PSTN devices 856. For example, a PSTN switch 858 may connect the one or more PSTN devices 856 to the PSTN 850. PSTN devices 856 may include a variety of devices ranging from traditional landline devices to mobile/cellular devices. In some embodiments, the PSTN can connect to a network-based communication system via a datacenter.

The PSTN 850 may include, but is not limited to telephone lines, fiber optic cables, microwave transmission links, cellular networks, communications satellites, and undersea telephone cables. Switching centers may interconnect each of this components and networks. Further, the PSTN 850 may be analog or digital. In addition, the PSTN 850 may use protocols such as common channel signaling system 7 ("CCS7"). CCS7 is a set of protocols used in the PSTN 850 to setup and tear down communications between subscribers (i.e., users).

As illustrated in FIG. 8, the telecommunications system 800 may include an IP/packet network 852. The IP/packet network 852 may be part of a network-based system, such as a VoIP communication system. VoIP systems are generally known for transmitting voice packets between users. However, VoIP systems also handle other forms of communication, such as video, audio, photographs, multimedia, data, etc. For example, VoIP systems provide communication services for telephone calls, faxes, text messages, and voice-messages.

The IP/packet network 852 provides communications services between users over the Internet 806 rather than using a traditional PSTN 850. However, VoIP systems also allow users to communicate with users using PSTN 850. Thus, a subscriber using a network device 802 may communicate with a subscriber using a PSTN device 856. Furthermore, VoIP systems allow users to communicate with each other without accessing the PSTN 850.

Embodiments disclosed herein may comprise or utilize a special purpose or general-purpose computer including computer hardware, such as, for example, one or more processors and system memory, as discussed in greater detail below. Embodiments within the scope disclosed herein also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the invention can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the invention. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As illustrated in FIG. 8, the IP/packet network 852 may also include network devices 802 devices and datacenters 804. The network devices 802 devices and datacenters 804 illustrated in FIG. 8 may be exemplary configurations of the network device 102 and servers 108 described above. For example, example of network devices 802 include a variety of devices, such as personal computers, a tablet computer, handheld devices, mobile phones, smartphones, personal digital assistants ("PDA"), in- or out-of-car navigation systems, and other electronic access devices. In addition, the network device 802 may be part of an enterprise environment, such as a professional business exchange ("PBX"), a small office/home office environment, or a home/personal environment.

As briefly described above, network devices 802 may include dedicated devices and soft devices. Dedicated devices are commonly designed and appear like a digital business telephone. Soft devices or softphones refer to software installed on a computing device. This software utilizes microphone, audio, and/or video capabilities of the computing device and provides traditional calling functionality to a user, operated via a user interface.

Datacenter 804 may facilitate communications between network devices 802. For example, datacenter 804 registers devices, stores device identification and address information, tracks current communications, and logs past communications, etc., as described above. In addition, datacenters 804 also assists network devices in provisioning, signaling, and establishing user communications via a media bridge.

In the case of multiple datacenters 804, one datacenter 804 may communicate with another datacenter 804. For example, one datacenter 804 may send gathered network device 802 information to the other datacenter 804. In particular, when a datacenter 804 registers a network device 802, that datacenter 804 may send the address information to the other datacenters 804 located on the IP/packet network 852. Accordingly, each datacenter 804 may communicate with other datacenters 1104 and assist the IP/packet network 1152 in balancing network and processing loads. Further, the datacenters 804 may assist the IP/packet network 852 to ensure that multi-device multi-device communication sessions between network devices 802 do not fail by communicating with each other.

As illustrated, the network devices 802 and the datacenters 804 may be connected to the IP/packet network 852 via IP switches 860a-b. IP switches 860a-b manage the flow of data across the IP/packet network 852 by transmitting a received message to the device for which the message was intended. In some configurations, the IP switches 860a-b may also perform router functions. Further, while not illustrated, one or more modems may be in electronic communication with the IP switches 860a-b.

In addition, the IP/packet network 852 may facilitate session control and signaling protocols to control the signaling, set-up, and teardown of communication sessions. In particular, the IP/packet network 852 may employ SIP signaling. For example, the IP/packet network 852 may include a SIP server that processes and directs signaling between the network devices 802 and the IP/packet network 852. Other protocols may also be employed. For example, the IP/packet network 852 may adhere to protocols found in the H.225, H.323, and/or H.245 standards, as published by the International Telecommunications Union, available at the following URL—http://www.itu.int/publications.

In particular, session initiation protocol ("SIP") is a standard proposed by the Internet Engineering Task Force ("EITF") for establishing, modifying, and terminating multimedia IP sessions. Specifically, SIP is a client/server protocol in which clients issue requests and servers answer with responses. Currently, SIP defines requests or methods, including INVITE, ACK, OPTIONS, REGISTER, CANCEL, and BYE.

The INVITE request is used to ask for the presence of a contacted party in a multimedia session. The ACK method is sent to acknowledge a new connection. The OPTIONS request is used to get information about the capabilities of the server. In response to an OPTIONS request, the server returns the methods that it supports. The REGISTER method informs a server about the current location of the user. The CANCEL method terminates parallel searches. The client sends a BYE method to leave a session. For example, for a communication session between two network devices 802, the BYE method terminates the communication session.

Once signaling is established, the IP/packet network 852 may establish a media bridge. The media bridge caries the payload data for a communication session. The media bridge is separate for the device signaling. For example, in a videoconference, the media bride includes audio and video data for a communication session.

As described above a datacenter 804 may facilitate a media bridge path for a network device 802. For example, when one network device 802 attempts the contact a second network device 802, the datacenter 804 may execute the signaling and also determine a media bridge between the two network devices 802. Further, the datacenter 804 may provide alternative media bridge paths to the network devices 802 in the event that the primary media bridge weakens, for example, below a threshold level, or even fails.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments disclosed herein.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A network-based communication system comprising:
at least one processor; and
at least one non-transitory computer-readable storage medium storing instruction thereon that, when executed by the at least one processor, cause the system to:
establish, by the network-based communication system, a communication session between a group of network devices, wherein each network device from the group of network devices is associated with a first relay device by:
enabling, by the network-based communication system, each network device from the group of network devices to send a media stream to the first relay device causing the first relay device to receive a group of media streams corresponding to the group of network devices; and
enabling, by the network-based communication system, the first relay device to send a subset of media streams from the group of media streams to each network device from the group of network devices;
detect, by the network-based communication system and during the communication session, a request to add an additional network device to the communication session;
determine that a geographical distance between the additional network device and the first relay device exceeds a distance threshold;
based on determining that the geographical distance exceeds the distance threshold, associate the additional network device with a second relay device within a proximity range of the additional network device; and generate, by the network-based communication system and based on the request to add the additional network device to the communication session, a relay communication link between the first relay device and the second relay device to enable communication between the group of network devices associated with the first relay device and the additional network device associated with the second relay device.

2. The network-based communication system of claim 1, further comprising enabling the first relay device to send the subset of media streams from the group of media streams to each network device by enabling the first relay device to send at least one of an audio stream, a video stream, or no media stream from a network device from the group of network devices as part of the subset of media streams.

3. The network-based communication system of claim 1, wherein generating the relay communication link between the first relay device and the second relay device comprises enabling the first relay device to send the group of media streams corresponding to the group of network devices to the second relay device via the relay communication link.

4. The network-based communication system of claim 3, wherein generating the relay communication link between the first relay device and the second relay device further comprises enabling the second relay device to send an additional media stream corresponding to the additional network device to the first relay device via the relay communication link.

5. The network-based communication system of claim 4, wherein generating the relay communication link between the first relay device and the second relay device further comprises causing the first relay device to provide the additional media stream corresponding to the additional network device to each network device in the group of network devices associated with the first relay device.

6. The network-based communication system of claim 5, wherein generating the relay communication link between the first relay device and the second relay device further comprises causing the second relay device to provide the group of media streams corresponding to the group of network devices to the additional network device associated with the second relay device.

7. The network-based communication system of claim 1, further comprising instructions that, when executed by the at least one processor, cause the network-based communication system to associate the second relay device with the additional network device based on determining that a number of network devices in the group of network devices associated with the first relay device exceeds a device connection threshold.

8. The network-based communication system of claim 1, further comprising instructions that, when executed by the at least one processor, cause the network-based communication system to enable the first relay device to send the subset of media streams by:
enabling the first relay device to determine communication settings associated with each network device from the group of network devices; and
enabling the first relay device to, based on the communication settings, determine media streams to include within the subset of media streams.

9. The network-based communication system of claim 1, further comprising instructions that, when executed by the at least one processor, cause the network-based communication system to:

detect, during the communication session, a request to add a second additional network device associated with a third relay device to the communication session;
generate, during the communication session, a second relay communication link between the first relay device and the third relay device to enable communication between the group of network devices associated with the first relay device and the second additional network device associated with the third relay device; and
generate, during the communication session, a third relay communication link between the second relay device and the third relay device to enable communication between the additional network device associated with the second relay device and the second additional network device associated with the third relay device.

10. The network-based communication system of claim 1, further comprising instructions that, when executed by the at least one processor, cause the network-based communication system to:
detect, during the communication session, that the additional network device left the communication session; and
remove, in response to detecting that the additional network device left the communication session, the relay communication link between the first relay device and the second relay device while maintaining the communication session between the group of network devices associated with the first relay device.

11. The network-based communication system of claim 1, wherein the first relay device is located within a local area network and the second relay device is located outside of the local area network.

12. The network-based communication system of claim 11, wherein:
the group of network devices are located within the local area network; and
the additional network device is located outside the local area network.

13. A method comprising:
establishing, by a network-based communication system, a communication session between a group of network devices, wherein each network device from the group of network devices is associated with a first relay device by:
enabling, by the network-based communication system, each network device from the group of network devices to send a media stream to the first relay device causing the first relay device to receive a group of media streams corresponding to the group of network devices; and
enabling, by the network-based communication system, the first relay device to send a subset of media streams from the group of media streams to each network device from the group of network devices;
detecting, by the network-based communication system and during the communication session, a request to add an additional network device to the communication session;
determining that a geographical distance between the additional network device and the first relay device exceeds a distance threshold;
based on determining that the geographical distance exceeds the distance threshold, associating the additional network device with a second relay device within a proximity range of the additional network device; and
generating, by the network-based communication system and based on the request to add the additional network device to the communication session, a relay communication link between the first relay device and the second relay device to enable communication between the group of network devices associated with the first relay device and the additional network device associated with the second relay device.

14. The method of claim 13, further comprising associating the second relay device with the additional network device based on determining that a number of network devices in the group of network devices associated with the first relay device exceeds a device connection threshold.

15. The method of claim 13, further comprising enabling the first relay device to send the subset of media streams from the group of media streams to each network device by enabling the first relay device to send at least one of an audio stream, a video stream, or no media stream from a network device from the group of network devices as part of the subset of media streams.

16. The method of claim 13, further comprising:
detecting, during the communication session, that the additional network device left the communication session; and
removing, in response to detecting that the additional network device left the communication session, the relay communication link between the first relay device and the second relay device while maintaining the communication session between the group of network devices associated with the first relay device.

17. A non-transitory computer readable storage medium comprising instructions that, when executed by at least one processor, cause a computer device to:
establish, by a network-based communication system, a communication session between a group of network devices, wherein each network device from the group of network devices is associated with a first relay device by:
enabling, by the network-based communication system, each network device from the group of network devices to send a media stream to the first relay device causing the first relay device to receive a group of media streams corresponding to the group of network devices; and
enabling, by the network-based communication system, the first relay device to send a subset of media streams from the group of media streams to each network device from the group of network devices;
detect, during the communication session, a request to add an additional network device to the communication session;
determine that a geographical distance between the additional network device and the first relay device exceeds a distance threshold;
based on determining that the geographical distance exceeds the distance threshold, associate the additional network device with a second relay device within a proximity range of the additional network device; and
generate, based on the request to add the additional network device to the communication session, a relay communication link between the first relay device and the second relay device to enable communication between the group of network devices associated with the first relay device and the additional network device associated with the second relay device.

18. The non-transitory computer readable storage medium of claim 17, further comprising instructions that, when executed by the at least one processor, cause the computer device to associate the second relay device with the additional network device based on determining that a number of network devices in the group of network devices associated with the first relay device exceeds a device connection threshold.

19. The non-transitory computer readable storage medium of claim 17, wherein the first relay device is located within a local area network and the second relay device is located outside of the local area network.

20. The non-transitory computer readable storage medium of claim 17, further comprising instructions that, when executed by the at least one processor, cause the computer device to:
detect, during the communication session, that the additional network device left the communication session; and
remove, in response to detecting that the additional network device left the communication session, the relay communication link between the first relay device and the second relay device while maintaining the communication session between the group of network devices associated with the first relay device.

* * * * *